US012617602B2

(12) United States Patent
Govindan Radhakrishnan

(10) Patent No.: US 12,617,602 B2
(45) Date of Patent: May 5, 2026

(54) AEROSOL DISPENSER AND NOZZLE WITH REDUCED DRIP

(71) Applicant: The Procter & Gamble Company, Cincinnati, OH (US)

(72) Inventor: Kumaresh Govindan Radhakrishnan, Montgomery, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 207 days.

(21) Appl. No.: 18/512,182

(22) Filed: Nov. 17, 2023

(65) Prior Publication Data

US 2024/0166426 A1 May 23, 2024

Related U.S. Application Data

(60) Provisional application No. 63/426,398, filed on Nov. 18, 2022.

(51) Int. Cl.
*B65D 83/28* (2025.01)
*B05B 1/34* (2006.01)
(Continued)

(52) U.S. Cl.
CPC ............ *B65D 83/28* (2013.01); *B05B 1/3436* (2013.01); *B65D 83/44* (2013.01); *B65D 83/206* (2013.01); *B65D 83/48* (2013.01)

(58) Field of Classification Search
CPC ...... B65D 83/28; B65D 83/44; B65D 83/206; B65D 83/48; B05B 1/3436
See application file for complete search history.

(56) References Cited

U.S. PATENT DOCUMENTS 4,260,110 A * 4/1981 Werding ............... B05B 7/0425 239/404
4,322,037 A 3/1982 Heeb
(Continued)

FOREIGN PATENT DOCUMENTS

WO 2018146433 A1 8/2018

OTHER PUBLICATIONS

PCT Search Report and Written Opinion for PCT/US2023/080196 dated Mar. 6, 2024, 19 pages.
(Continued)

*Primary Examiner* — Frederick C Nicolas
(74) *Attorney, Agent, or Firm* — Elizabeth A. Conklin; Carolyn S. Powell

(57) ABSTRACT

A spray dispenser includes a container, a valve body, a valve stem, a supply channel, an actuator, and a nozzle. The container valve stem, supply channel and nozzle are in fluid communication. The valve stem is movable from a closed position to a fully open position, wherein in the closed position the valve stem channel is not in fluid communication with the interior of the container, wherein in the fully open position the valve stem channel is in fluid communication with the interior of the container. The actuator is in operative communication with the valve stem, wherein the actuator is movable from resting position to a fully actuated position, wherein in the resting position the valve stem is in the closed position, and wherein in the fully actuated position the valve stem is in the fully open position. The supply channel defines a supply channel length $L_{SC}$ measured along a central axis fluid flow through the supply channel, wherein the supply channel length $L_{SC}$ is greater than 23 mm. A minimum Dv90 particle size exiting the discharge orifice when the valve stem is fully open defines a fully open minimum Dv90 particle size, and wherein a maximum Dv90
(Continued)

particle size exiting the discharge orifice when the valve stem is fully open defines a fully open maximum Dv90 particle size, wherein a fully open Dv90 particle size range is the difference between the fully open maximum Dv90 particle size and the fully open minimum Dv90 particle size, wherein the fully open Dv90 particle size range may be less than 10 microns.

20 Claims, 14 Drawing Sheets

(51) Int. Cl.

| | |
|---|---|
| ***B65D 83/44*** | (2006.01) |
| *B65D 83/206* | (2025.01) |
| *B65D 83/48* | (2006.01) |

(56) References Cited

U.S. PATENT DOCUMENTS 7,621,468 B2 * 11/2009 Smith .................. B65D 83/206 222/402.15
2009/0020621 A1 * 1/2009 Clark .................... B05B 1/3442 222/402.1
2009/0057447 A1 * 3/2009 Lowry ................. B65D 83/206 239/601
2011/0303767 A1 * 12/2011 Smith .................. B65D 83/753 239/338
2016/0039596 A1 * 2/2016 Nelson .................. B05B 1/3426 239/590.5
2016/0068331 A1 3/2016 Clark et al.
2021/0169061 A1 * 6/2021 Majher .................. A01N 37/12
2022/0279782 A1 * 9/2022 Forst ....................... B65D 83/40
2022/0402685 A1 * 12/2022 Nguyen ............... B65D 83/141
2024/0166427 A1 * 5/2024 Govindan Radhakrishnan ........... B05B 7/241

OTHER PUBLICATIONS

All Office Actions; U.S. Appl. No. 18/512,224, filed Nov. 17, 2023.
Coster: “Coster Catalogue”, Retrieved from the internet, URL: www.coster.com, Feb. 15, 2015, p. 173-p. 175.
Unpublished U.S. Appl. No. 18/512,224, filed Nov. 17, 2023, to Kumaresh Govindan Radhakrishnan.

* cited by examiner

AEROSOL DISPENSER AND NOZZLE WITH REDUCED DRIP

FIELD

The present disclosure is directed to a nozzle for a spray dispenser, and, more particularly, to a nozzle and spray dispenser for use with compressed gas propellants.

BACKGROUND

Pressurized spray dispensers for dispensing compositions, such as liquid compositions, are known in the art. Some spray dispensers are pressurized with compressed gas, such as nitrogen or air. As a composition is dispensed from a spray dispenser that utilizes compressed gas as the propellant, the pressure in the container reduces, which, in turn, can impact the particle size and flow rate of the dispensed composition. The particle size and flow rate of the dispensed composition may also be influenced by the structure of the dispensing system and/or the nozzle of the spray dispenser. A spray dispenser may include a container for containing the composition and a compressed gas propellant, a valve assembly in fluid communication with the container, a supply channel in fluid communication with the valve assembly, a nozzle in fluid communication with the supply channel, and an actuator in operative communication with the valve assembly. Various aspects of the valve assembly, supply channel, and/or nozzle may influence the particle size and flow rate. For example, a relatively long supply channel allows for a greater accumulation of composition. When the valve assembly adjusts from a fully open position where the composition is being dispensed to a closed position where the composition is no longer being fed from the container to the valve assembly, the composition in the supply channel and nozzle will continue to dispense from the nozzle until the pressure in the supply channel is too low to force the composition out of the nozzle. The change in pressure in the supply channel as the last remaining composition from the supply channel is dispensed through the nozzle may result in larger particles that may appear to a user as drips or larger droplets that more easily fall to the floor. This phenomenon may be undesirable for a user. Thus, it would be beneficial to provide a nozzle and spray dispenser that is capable of maintaining a uniform and relatively small particle size during a single spray duration with a compressed gas as the propellant.

SUMMARY

"Combinations:"

A. A spray dispenser, the dispenser comprising:
- a container comprising a first end portion, a second end portion, and a sidewall extending between the first end portion and the second end portion, the container defining an interior for containing a composition and a compressed gas propellant, wherein the first end portion comprises a neck defining an opening;
- a valve body disposed at least partially within the opening of the container, the valve body comprising an inner passageway in fluid communication with the container,
- a valve stem extending through the inner passageway, wherein the valve stem having a valve stem channel, the valve stem is movable from a closed position to a fully open position, wherein in the closed position the valve stem channel is not in fluid communication with the interior of the container, wherein in the fully open position the valve stem channel is in fluid communication with the interior of the container;
- a supply channel in fluid communication with the valve stem, wherein the supply channel defines a supply channel length $L_{SC}$ measured along a central axis fluid flow through the supply channel, wherein the supply channel length $L_{SC}$ is greater than 23 mm;
- an actuator in operative communication with the valve stem, wherein the actuator is movable from resting position to a fully actuated position, wherein in the resting position the valve stem is in the closed position, and wherein in the fully actuated position the valve stem is in the fully open position;
- a nozzle in fluid communication with the supply channel, wherein the nozzle comprises a swirl chamber in fluid communication with a discharge orifice,
- wherein a minimum Dv90 particle size exiting the discharge orifice when the valve stem is either in the fully open position or when the valve stem is displacing from the fully open position to the closed position defines a minimum Dv90 particle size, and wherein a maximum Dv90 particle size exiting the discharge orifice when the valve stem displaces from the fully open position to the closed position defines a closing maximum Dv90 particle size, wherein a ratio of the closing maximum Dv90 particle to the minimum Dv90 particle size is less than 3.5, measured according to the Dv90 Particle Size Test Method described herein.

B. The spray dispenser of Paragraph A, wherein the container comprises a composition and a compressed gas propellant.

C. The spray dispenser of Paragraph B, wherein the composition is an air or fabric freshening composition.

D. The spray dispenser of any of Paragraphs A through C, wherein a flow rate of the composition discharged from the nozzle is in the range of about 1.3 g/s to about 1.9 g/s.

E. The spray dispenser of any of Paragraphs A through D, wherein the minimum Dv90 particle size is in the range of about 60 microns to about 90 microns.

F. The spray dispenser of any of Paragraphs A through E, wherein the initial pressure in the container is less than 1100 kPa at 21° C.

G. The spray dispenser of any of Paragraphs A through F, wherein the swirl chamber has a chamber diameter CD of 800 mm or less and a chamber depth CH of less than 500 microns.

H. The spray dispenser of any of Paragraphs A through G, wherein the actuator is a push-button or trigger.

I. The spray dispenser of any of Paragraphs A through H, wherein the container, the valve body, the valve stem, the nozzle, and the actuator comprise plastic.

J. A spray dispenser, the dispenser comprising:
- a container comprising a first end portion, a second end portion, and a sidewall extending between the first end portion and the second end portion, the container defining an interior for containing a composition and a compressed gas propellant, wherein the first end portion comprises a neck defining an opening;
- a valve body disposed at least partially within the opening of the container, the valve body comprising an inner passageway in fluid communication with the container,
- a valve stem extending through the inner passageway, wherein the valve stem having a valve stem channel, the valve stem is movable from a closed position to a fully open position, wherein in the closed position the valve stem channel is not in fluid communication with the interior of the container, wherein in the fully open position the valve stem channel is in fluid communication with the interior of the container;

a supply channel in fluid communication with the valve stem, wherein the supply channel defines a supply channel length $L_{SC}$ measured along a central axis fluid flow through the supply channel, wherein the supply channel length $L_{SC}$ is greater than 23 mm;

an actuator in operative communication with the valve stem, wherein the actuator is movable from resting position to a fully actuated position, wherein in the resting position the valve stem is in the closed position, and wherein in the fully actuated position the valve stem is in the fully open position;

a nozzle in fluid communication with the fluid channel, wherein the nozzle comprises a swirl chamber in fluid communication with a discharge orifice, wherein a minimum Dv90 particle size exiting the discharge orifice when the valve stem is fully open defines a fully open minimum Dv90 particle size, and wherein a maximum Dv90 particle size exiting the discharge orifice when the valve stem is fully open defines a fully open maximum Dv90 particle size, wherein a fully open Dv90 particle size range is the difference between the fully open maximum Dv90 particle size and the fully open minimum Dv90 particle size, wherein the fully open Dv90 particle size range may be less than 10 microns, measured according to the Dv90 Particle Size Test Method described herein.

K. The spray dispenser of Paragraph J, wherein the container comprises a composition and a compressed gas propellant.

L. The spray dispenser of Paragraph K, wherein the composition is an air or fabric freshening composition.

M. The spray dispenser of any of Paragraphs J through L wherein a minimum Dv90 particle size exiting the discharge orifice when the valve stem is either in the fully open position or when the valve stem is displacing from the fully open position to the closed position defines a minimum Dv90 particle size, and wherein a maximum Dv90 particle size exiting the discharge orifice when the valve stem displaces from the fully open position to the closed position defines a closing maximum Dv90 particle size, wherein a ratio of the closing maximum Dv90 particle to the minimum Dv90 particle size is less than 3.5, measured according to the Dv90 Particle Size Test Method described herein.

N. The spray dispenser of any of Paragraphs J through M, wherein a flow rate of the composition discharged from the nozzle is in the range of about 1.3 g/s to about 1.9 g/s.

O. The spray dispenser of any of Paragraphs J through N, wherein the minimum Dv90 particle size is in the range of about 60 microns to about 90 microns.

P. The spray dispenser of any of Paragraphs J through O, wherein the initial pressure in the container is less than 1100 kPa at 21° C.

Q. The spray dispenser of any of Paragraphs J through P, wherein the composition comprises a perfume mixture.

R. The spray dispenser of any of Paragraphs J through Q, wherein the actuator is a push-button or trigger.

S. The spray dispenser of any of Paragraphs J through R, wherein the container, the valve body, the valve stem, the nozzle, and the actuator comprise plastic.

T. The spray dispenser of any of Paragraphs J through S, wherein the swirl chamber has a chamber diameter of 800 mm or less.

DETAILED DESCRIPTION

Figure 1:
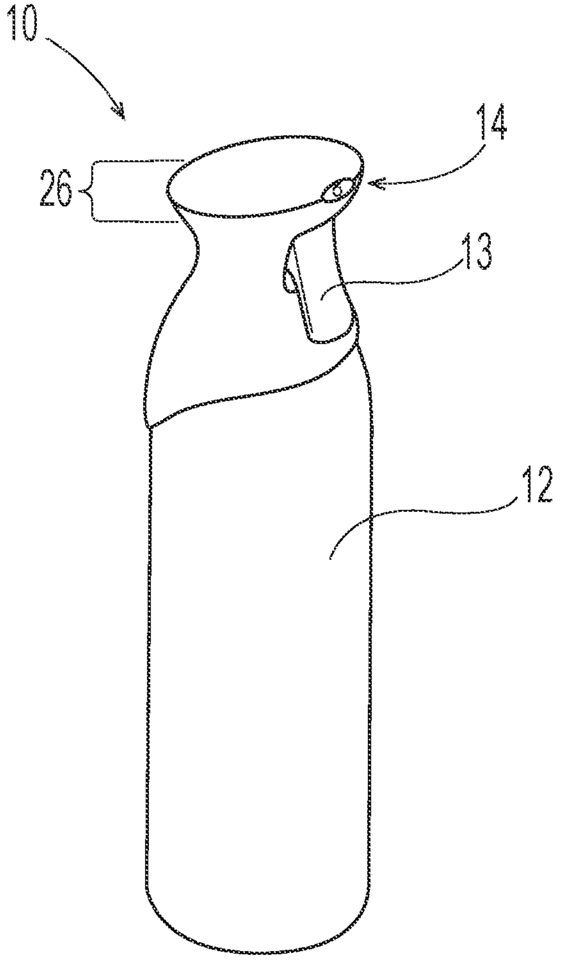
FIG. 1 is a perspective view of a spray dispenser.

The present disclosure may be understood more readily by reference to the following detailed description of illustrative and preferred embodiments. It is to be understood that the scope of the claims is not limited to the specific products, methods, conditions, devices, or parameters described herein, and that the terminology used herein is not intended to be limiting of the claimed embodiments of the disclosure.

Also, as used in the specification, including the appended claims, the singular forms "a," "an," and "the" include the plural, and reference to a particular numerical value includes at least that particular value, unless the context clearly dictates otherwise. When a range of values is expressed, another embodiment includes from the one particular value and/or to the other particular value. Similarly, when values are expressed as approximations, by use of the antecedent basis "about," it will be understood that the particular values form another embodiment. All ranges are inclusive and combinable. All percentages and ratios used herein are by weight of the total product, and all measurements made are at 21° C., unless otherwise designated.

A spray dispenser may include a container, a valve assembly in fluid communication with the container, an actuator in operative communication with the valve assembly, and a nozzle in fluid communication with the valve assembly. The container may be configured to contain a composition and a propellant. The propellant may be a compressed gas propellant.

With reference to FIGS. 1-8, a spray dispenser 10 may include a container 12, a valve assembly 11 in fluid communication with the container 12, an actuator 13 in operative communication with the valve assembly 11, and a nozzle 14 in fluid communication with the valve assembly 11. Portions of the valve assembly 11, actuator 13, and nozzle 14 may be at least partially contained within or in operative communication with a shroud 26. The shroud may provide a surface for the user to hold the spray dispenser. The shroud 26 may provide ergonomic functionality to the spray dispenser. The shroud 26 may also improve aesthetics of the spray dispenser by hiding some components With reference to FIGS. 5-8, the container 12 may include a first end portion 16, a second end portion 17, and a sidewall 18 extending between the first and second end portions 16 and 17. The container 12 defines an interior 15. The first end portion 16 of the container 12 includes a neck 22 defining an opening 21. The first end portion 16 of the container 12 may be configured as the top or bottom of the container. The container 12 may be configured to contain a composition and a propellant in the interior 15.

The container 12 may be used to hold composition and/or propellant. The container 12 may be any shape that allows composition and/or propellant to be held within the interior of the container. For example, the container may be peanut-shaped, oval-shaped, or rectangular-shaped. It is to be appreciated that the container 12 may be molded, which allows for any number of shapes to be used. The container 12 may be longitudinally elongated such that the container has an aspect ratio of a longitudinal dimension to a transverse dimension, such as diameter. The aspect ratio may be greater than 1, equal to 1, such as in a sphere or shorter cylinder, or an aspect ratio less than 1. The container may be cylindrical.

The container 12 may be configured for resting on horizontal surfaces such as shelves, countertops, tables etc. The first end portion or the second end portion may be configured to rest on a horizontal surface.

The second end portion 17 of the container 12 may include a re-entrant portion or base cup 25. The base cup 25 may be joined to the second end portion 17 of the container 12 and may aid in reinforcement of the second end portion 17 and/or may allow the container to rest on horizonal surfaces. The container 12 may not include a base cup and may be configured to sit on at least a portion of the second end portion 17. Suitable shapes of the second end portion 17 include petaloid, champagne, hemispherical, or other generally convex or concave shapes. Each of these shapes of the second end portion 17 may be used with or without a base cup 25. The container 12 may have a generally flat base. This flat base may be formed from the bottle itself with a possible indent.

The container 12 may be comprised of various materials including metal or plastic. The container 12 may include polyethylene terephthalate (PET), polyethylene furanoate (PEF), polyester, nylon, polyolefin, ethylene vinyl alcohol (EVOH), or mixtures thereof. The container may be a single layer or multi-layered. The container 12 may be injection molded or blow molded, such as in an injection-stretch blow molding process or an extrusion blow molding process.

The container 12 may range from about 6 cm to about 60 cm, or from about 10 cm to about 40 cm in height, taken in the axial direction. The container 12 may have a cross-section perimeter or diameter, if a round cross-section is selected, from about 3 cm to about 60 cm, or from about 4 cm to about 10 cm. The container may have a volume ranging from about 40 cubic centimeters to about 1000 cubic centimeters exclusive of any components therein, such as a composition delivery device 24.

Figure 7:
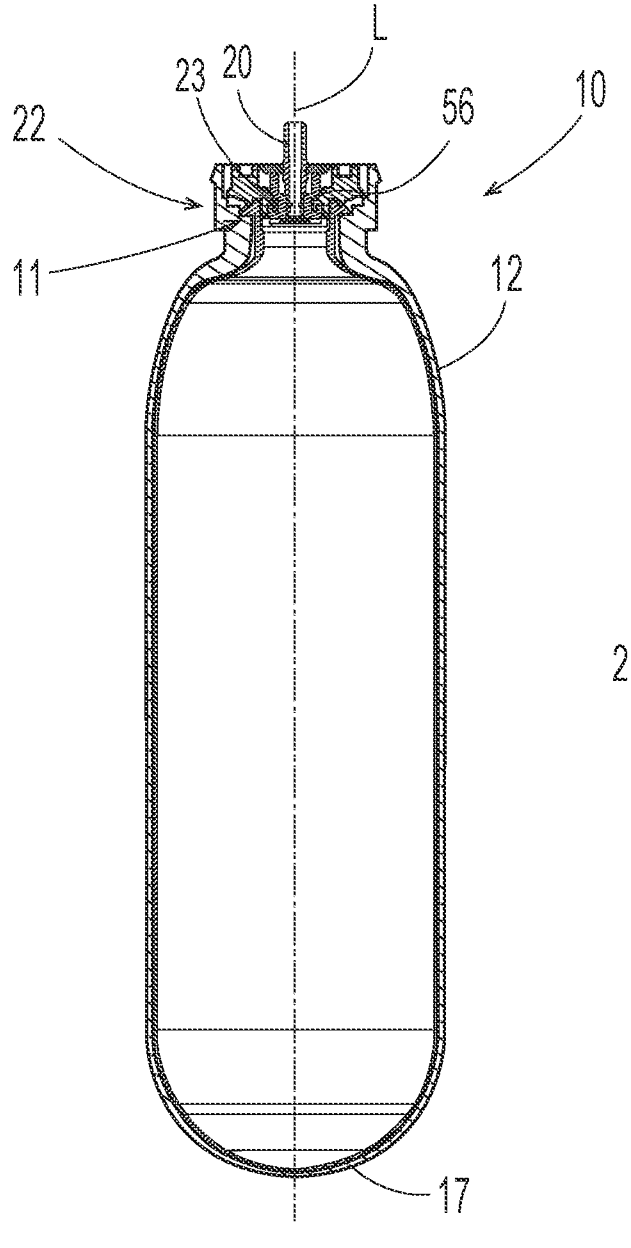
FIG. 7 is a sectional view of FIG. 5 having a composition delivery device in the form of a dip tube.
Figure 8:
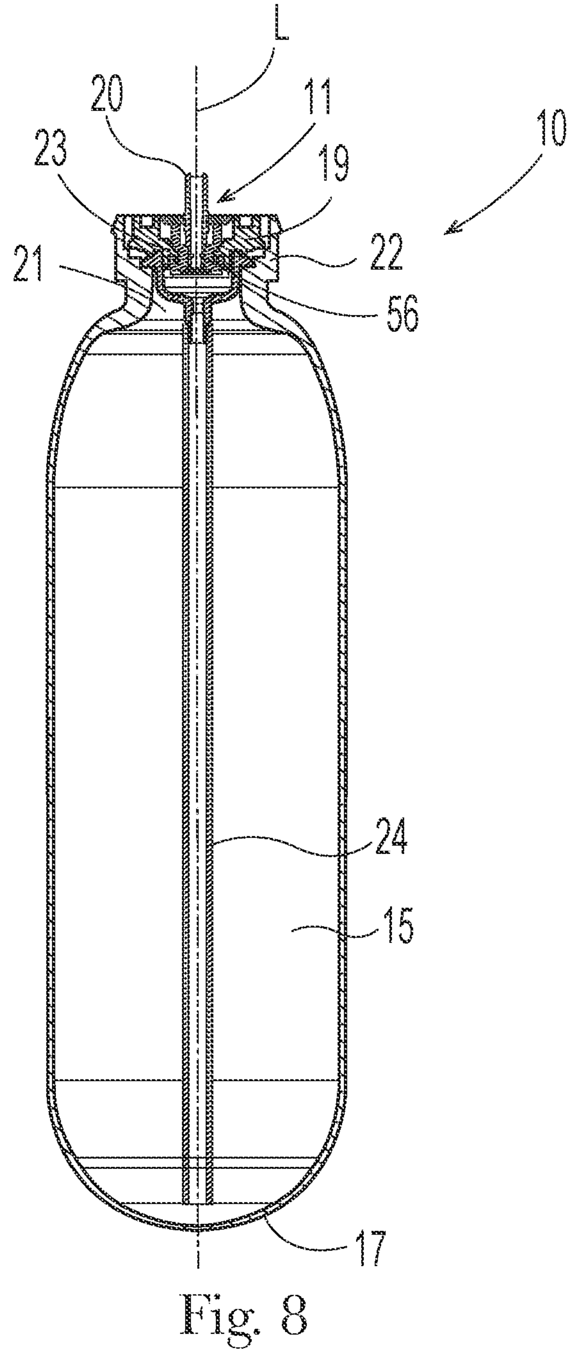
FIG. 8 is an exploded, perspective view of a shroud, actuator, manifold, and nozzle of a spray dispenser.

With reference to FIGS. 7-8, the spray dispenser 10 may include a composition delivery device 24. The composition delivery device 24 may be used to contain and/or provide for delivery of the composition and/or the propellant from the spray dispenser 10 upon demand. Suitable composition delivery devices 24 comprise a piston, a bag such as illustrated in FIG. 7, or a dip tube such as illustrated in FIG. 8. The composition delivery device 24 may include polyethylene terephthalate (PET), polypropylene (PP), polyethylene furanoate (PEF), polyester, nylon, polyolefin, EVOH, or mixtures thereof. When the composition delivery device 24 is in the form of a bag as illustrated in FIG. 7, the bag may be disposed within the container 12 and be configured to hold a composition therein. With continued reference to FIG. 7, propellant may be disposed within the container 12 and/or between the container and the bag. A portion of the bag 24 may be joined to at least one of the container 12 and a portion of the valve assembly 11, such as the valve body 19. The bag may be positioned between the container 12 and the valve body 19. The bag may be inserted into the container 12 and subsequently joined thereto. The bag may be joined to the valve body 19, and the valve body 19 joined to the bag may be subsequently inserted into the container 12.

The container 12 and/or the composition delivery device 24 may be transparent or substantially transparent. This arrangement provides the benefit that the consumer knows when composition is nearing depletion and allows improved communication of composition attributes, such as color, viscosity, etc. Also, indicia disposed on the container, such as labeling or other decoration of the container, may be more apparent if the background to which such decoration is applied is clear. Labels may be shrink wrapped, printed, etc., as are known in the art.

At 21° C., the container 12 may be pressurized to an initial internal gage pressure of about 500 kPa to about 1500 kPa, or from about 750 kPa to about 1300 kPa, or from about 900 kPa to about 1100 kPa using a propellant. An spray dispenser 10 may have an initial propellant pressure of about 1500 kPa and a final propellant pressure of about 120 kPa, an initial propellant pressure of about 1030 kPa to a final propellant pressure of about 550 kPa, an initial propellant pressure of about 900 kPa and a final propellant pressure of about 300 kPa to about 480 kPa, or an initial propellant pressure of about 500 kPa and a final propellant pressure of 0 kPa, including any values between the recited ranges. The volumetric ratio of composition to propellant may be in the range of about 40/60 to about 70/30, alternatively in the range of about 50/50 to about 60/40.

The propellant may include compressed gas, such as nitrogen and air, hydro-fluorinated olefins (HFO), such as trans-1,3,3,3-tetrafluoroprop-1-ene, and mixtures thereof. Propellants listed in the US Federal Register 49 CFR 1.73.115, Class 2. Division 2.2 may be acceptable. The propellant may be condensable. A condensable propellant, when condensed, may provide the benefit of a flatter depressurization curve at the vapor pressure, as composition is depleted during usage. A condensable propellant may provide the benefit that a greater volume of gas may be placed into the container at a given pressure. Generally, the highest pressure occurs after the spray dispenser is charged with the composition but before the first dispensing of that composition by the user.

With reference to FIGS. 7-11, the valve assembly 11 may be at least partially disposed in the opening 21 of the container 12 and may be joined to a portion of the neck 22 of the container 12. The term "joined" as used throughout this disclosure includes directly or indirectly joined. "Joined" includes removably joined and fixedly joined. "Joined" includes both mechanical attachment, such as by screws, bolts, interference fit, friction fit, crimping, welding, and integrally molding, and chemical attachment, such as by adhesive or the adhesive properties inherent in the materials being attached. The composition delivery device 24 may be joined to at least one of a portion of the container 12 and/or a portion of the valve assembly 11 and the composition delivery device 24 may be in fluid communication with the valve stem 20 and the nozzle 14.

With reference to FIGS. 7-8, the valve body 19 may extend about a longitudinal axis L. The valve body 19 may include an inner passageway 23 that may substantially surround the longitudinal axis 70.

The composition delivery device 24 may be disposed at least partially within the container 12 and the valve assembly 11 may be joined to the container 12 and may be in operative communication with the composition delivery device 24. The composition and the propellant may be stored in the container 12. Upon being dispensed, the composition and/or propellant may travel from and/or through the composition delivery device 24 and through the valve assembly 11.

With reference to FIGS. 9-12, the valve assembly 11 may be in fluid communication with a supply channel 32 of a manifold 29, which, in turn, is in fluid communication with the nozzle 14. The supply channel extends from the exit of the valve stem 20 (the start of the manifold 29) and extends through to the exit of the discharge orifice 44 adjacent the ambient environment. The nozzle 14 directs a composition out of the container 12 and into the environment or onto a target surface. The actuator 13 may be engaged by a user and is configured to initiate and terminate dispensing of the composition and/or propellant. Stated another way, the actuator 13 provides selective dispensing of the composition and/or propellant. The actuator 13 may be depressible, operable as a trigger, push-button, and the like, to cause release of a composition from the spray dispenser 10. The actuator 13 may be operatively connected with the valve assembly 11 and/or the shroud 26.

Figure 12:
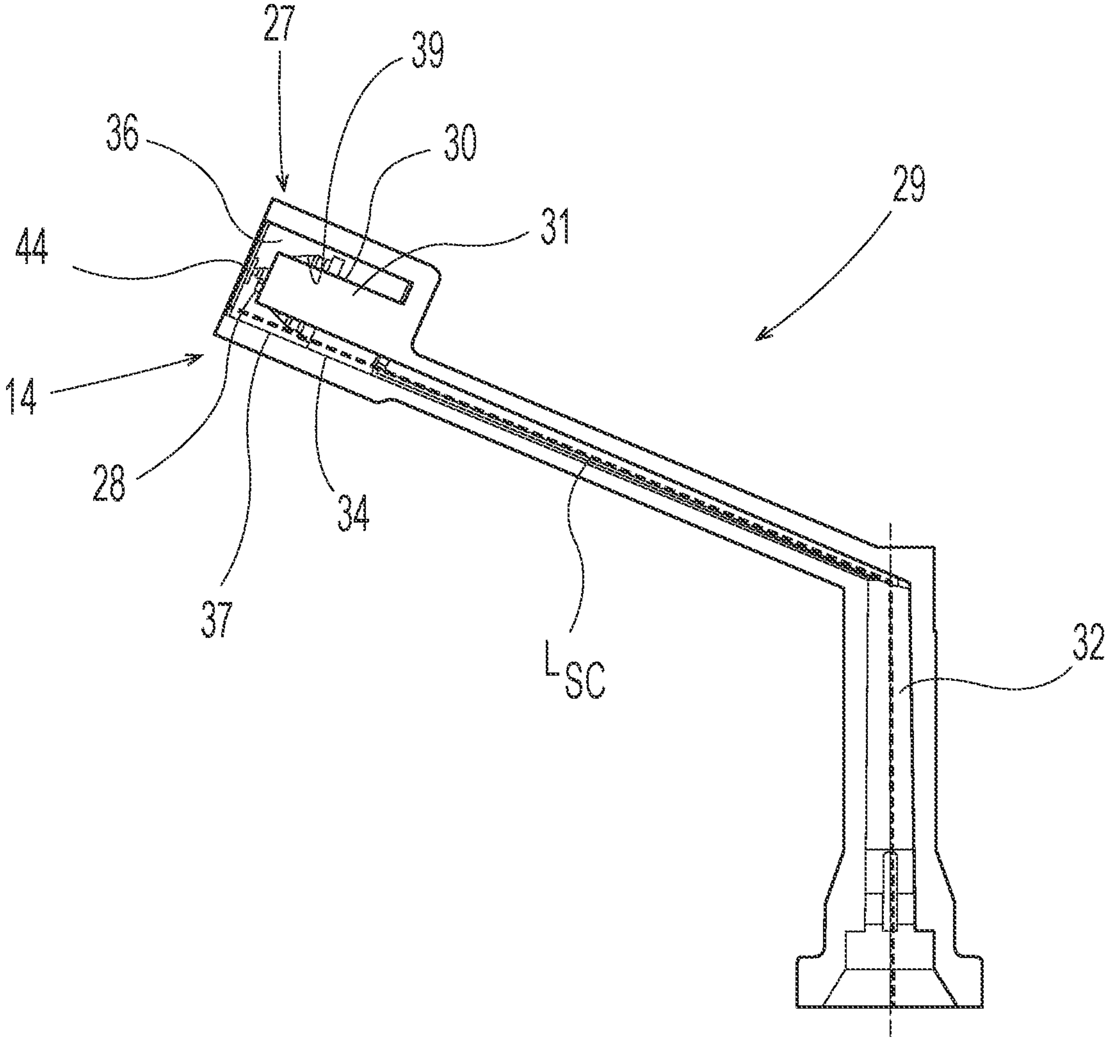
FIG. 12 is a sectional view of a manifold and nozzle.
Figure 13:
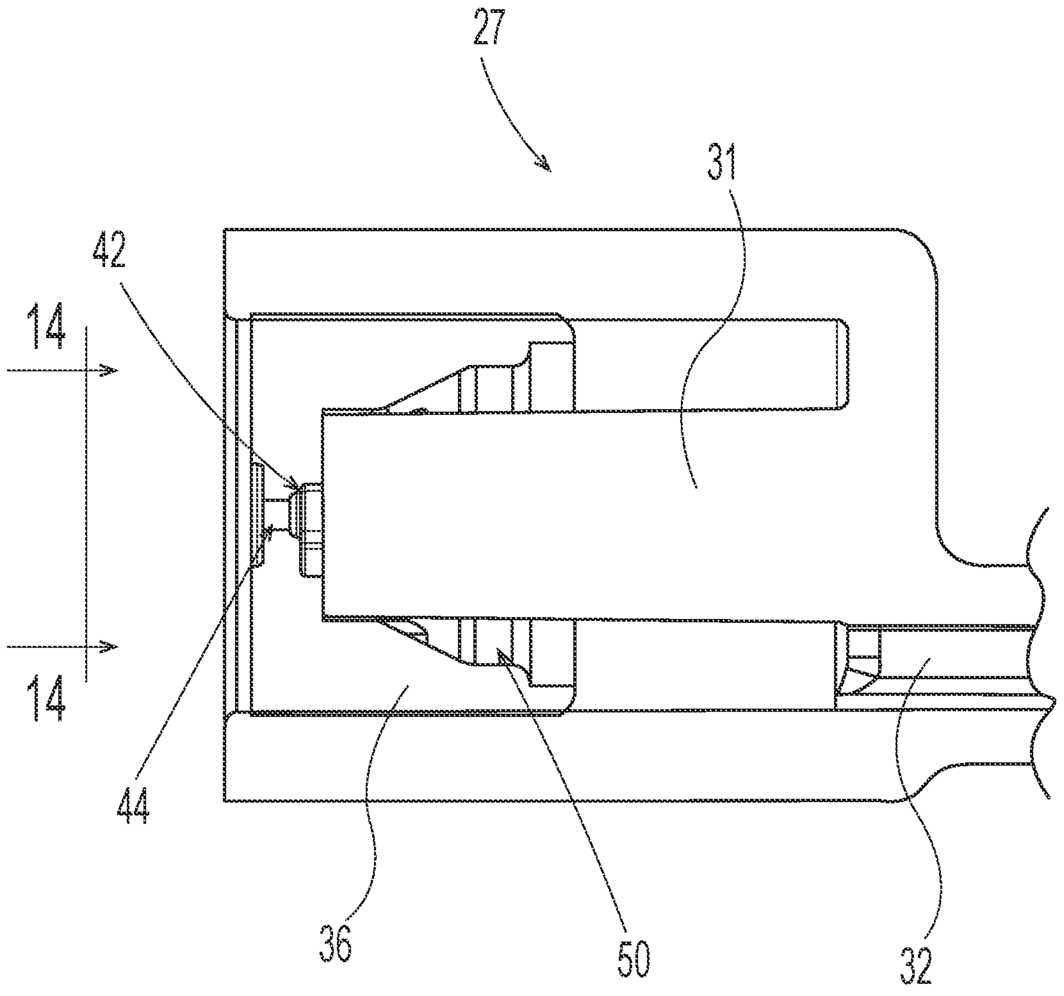
FIG. 13 is a sectional view of a portion of a manifold and nozzle.
Figure 14:
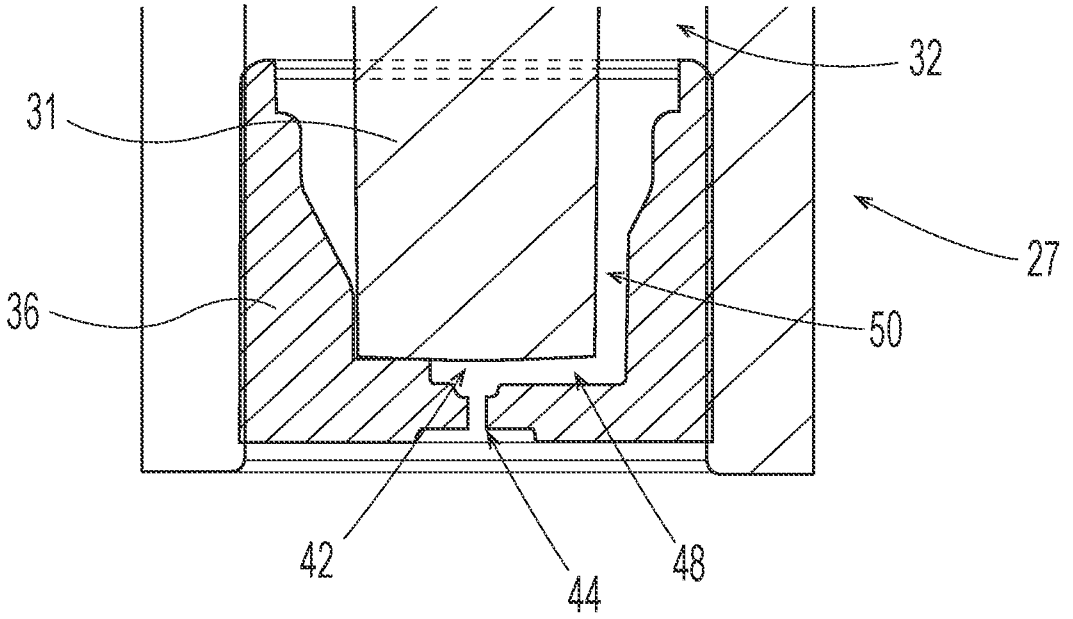
FIG. 14 is a sectional view of a portion of a nozzle including a nozzle body and nozzle insert.
Figure 15:
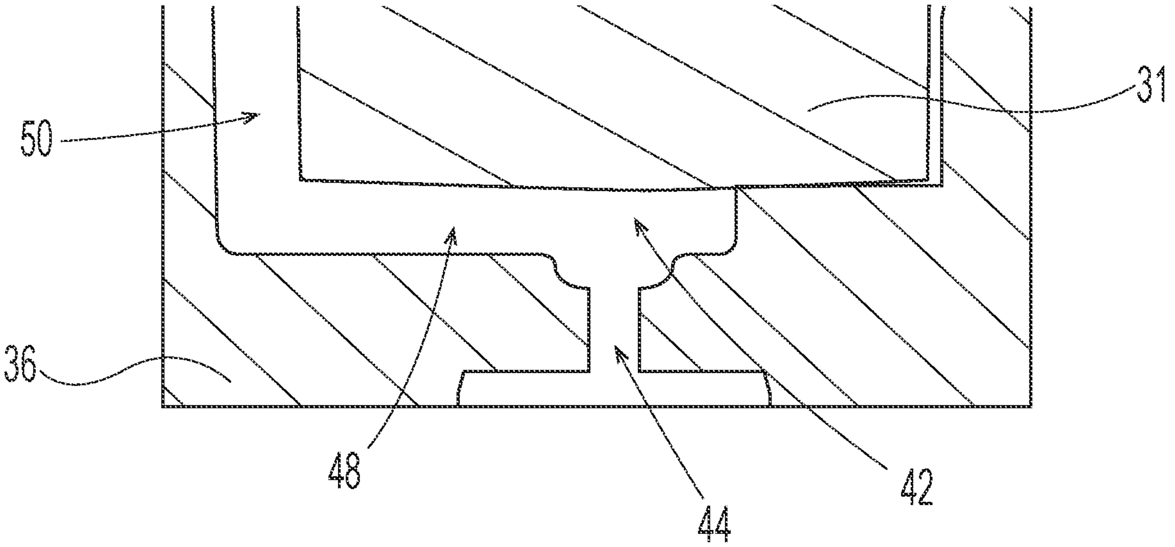
FIG. 15 is a sectional view of a portion of a nozzle including a nozzle body and nozzle insert.
Figure 16:
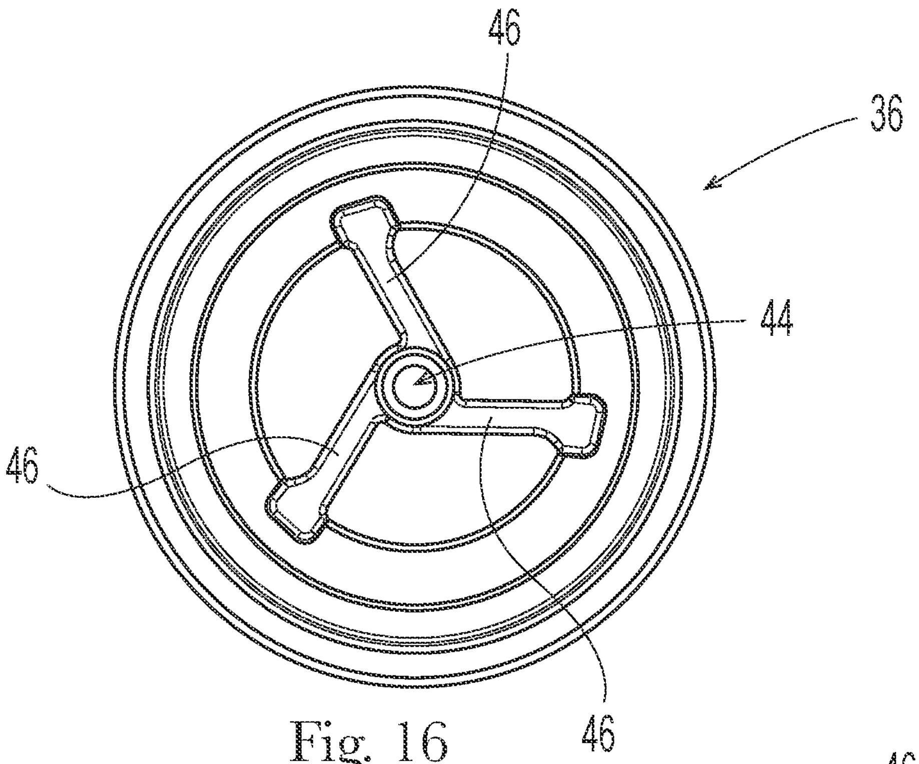
FIG. 16 is a elevation view of the interior of a nozzle insert having grooves, a swirl chamber, and a discharge orifice.
Figure 17:
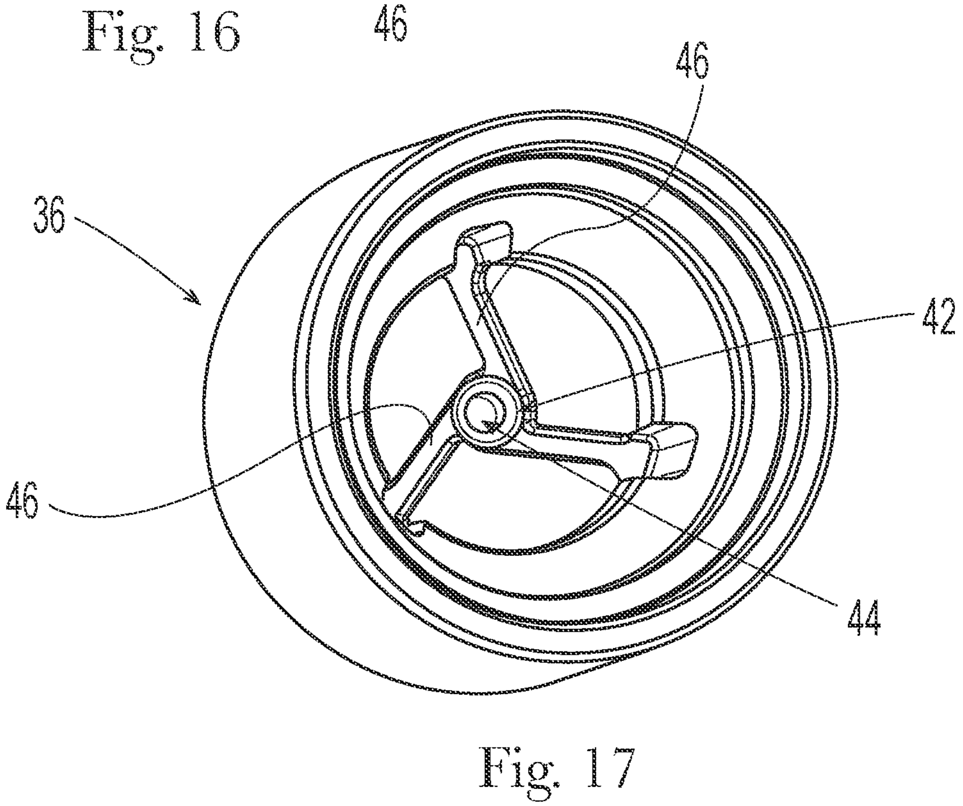
FIG. 17 is a perspective view of a nozzle insert having grooves, a swirl chamber, and a discharge orifice.
Figure 18:
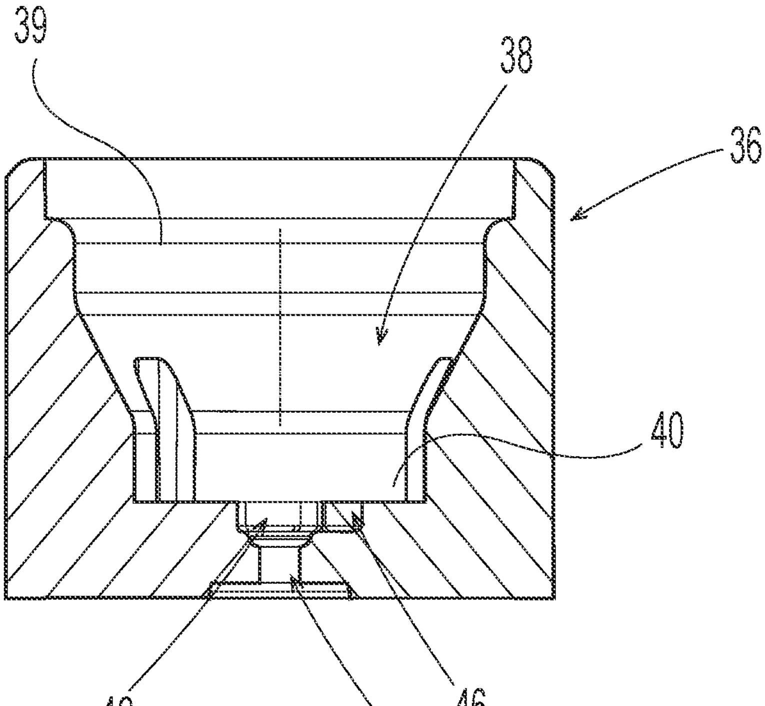
FIG. 18 is a sectional view of a nozzle insert.
Figure 19:
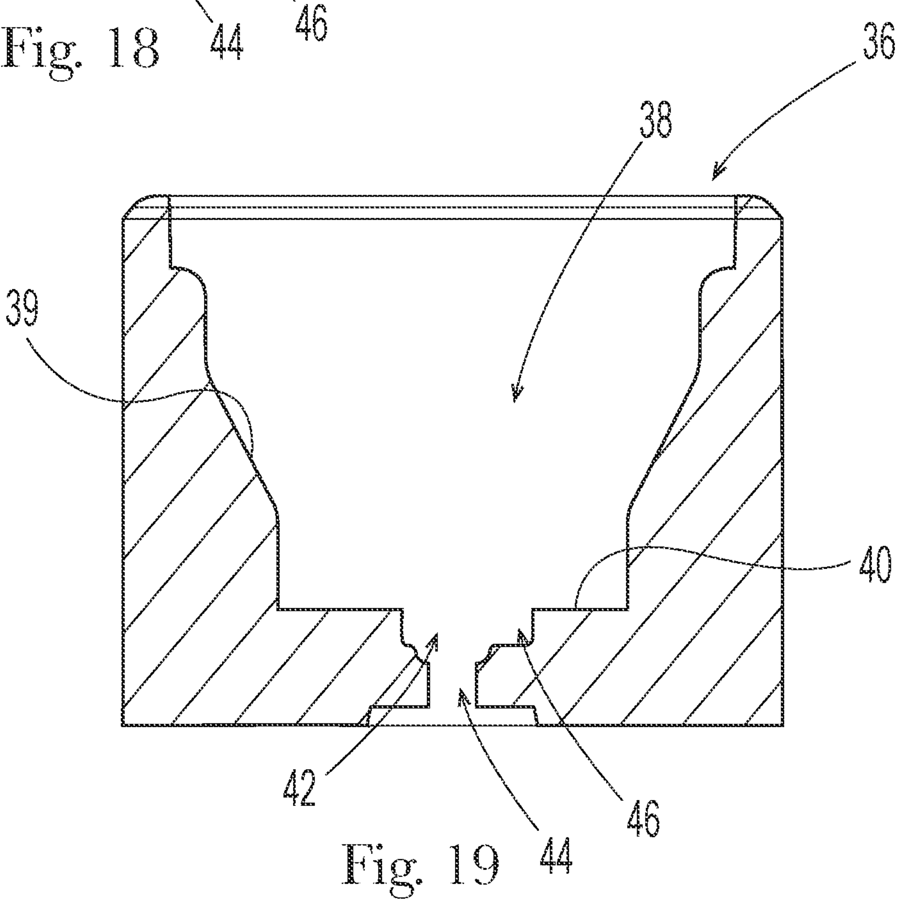
FIG. 19 is a sectional view of a nozzle insert.
Figure 20:
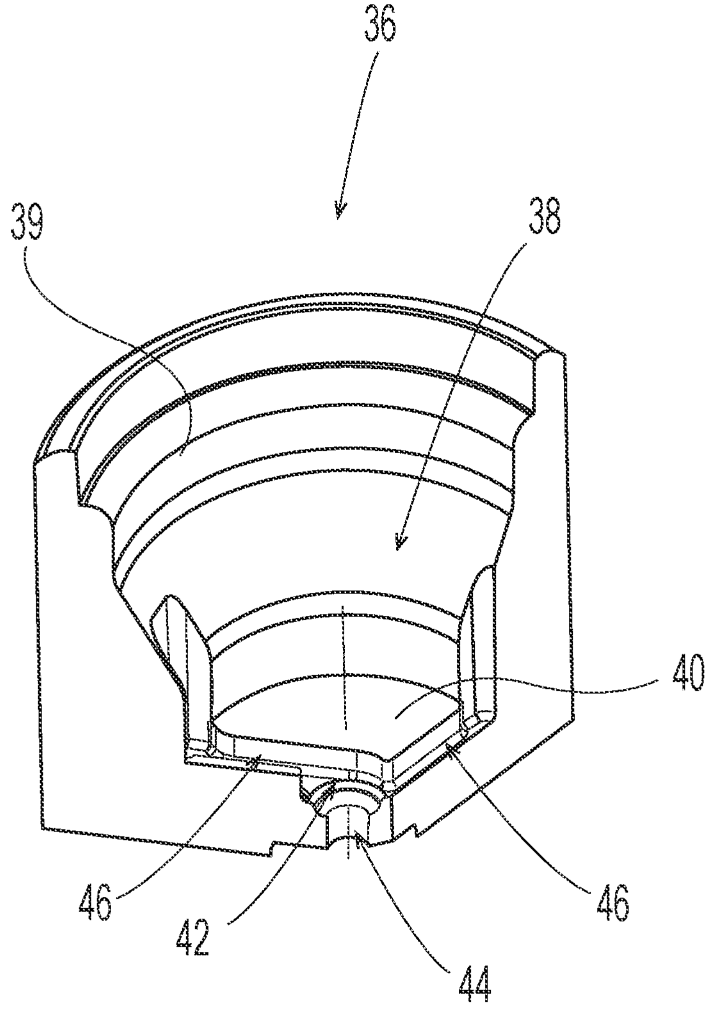
FIG. 20 is a sectional view of a nozzle insert.
Figure 21:
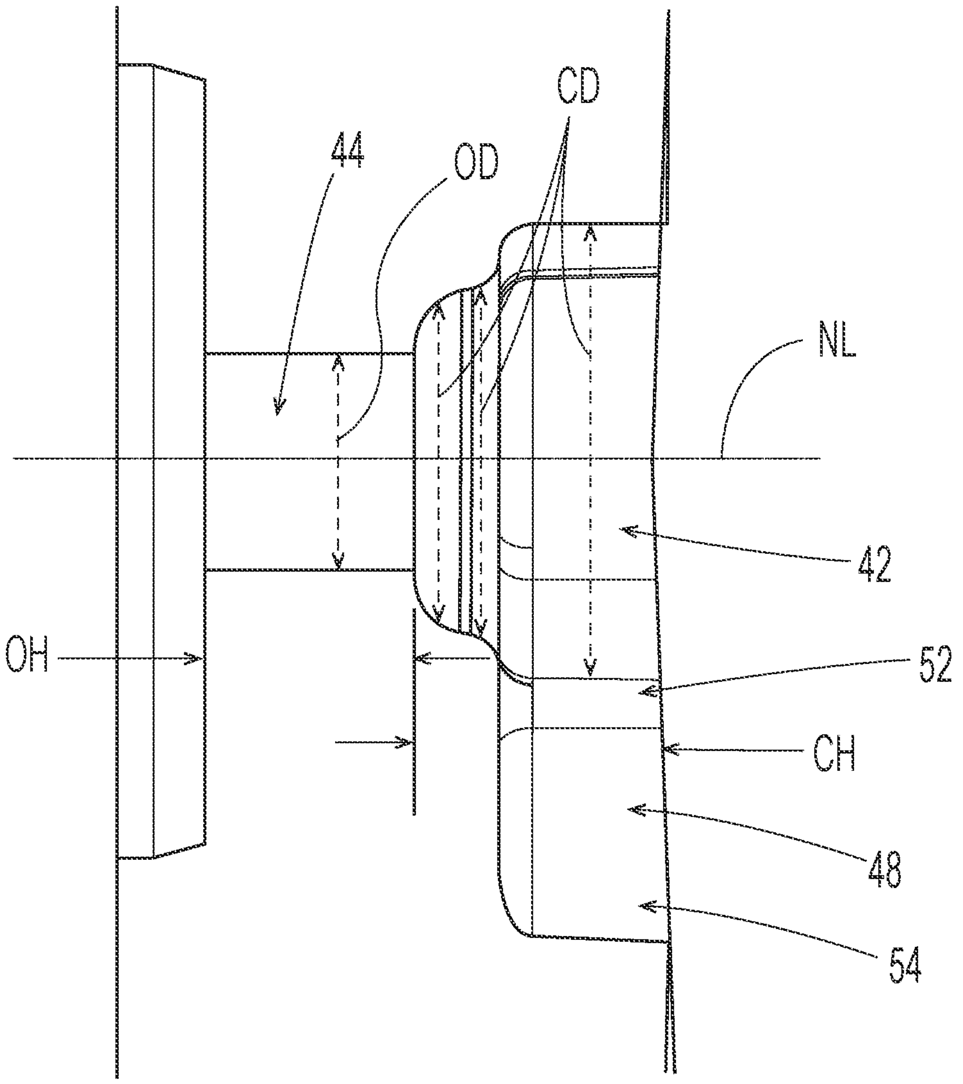
FIG. 21 is a sectional view of a portion of a nozzle insert.
Figure 22:
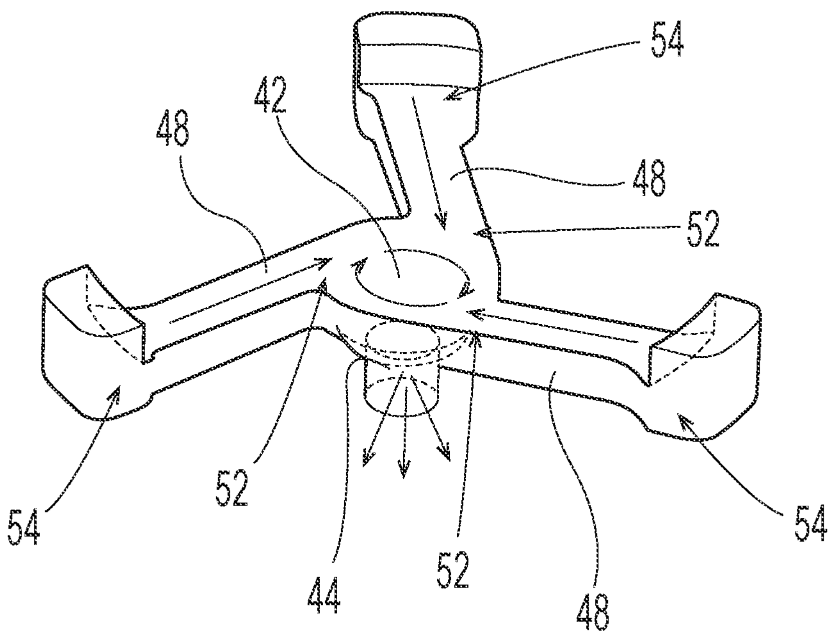
FIG. 22 is a perspective view of radial vanes, a swirl chamber, and a discharge orifice of a nozzle.
Figure 23:
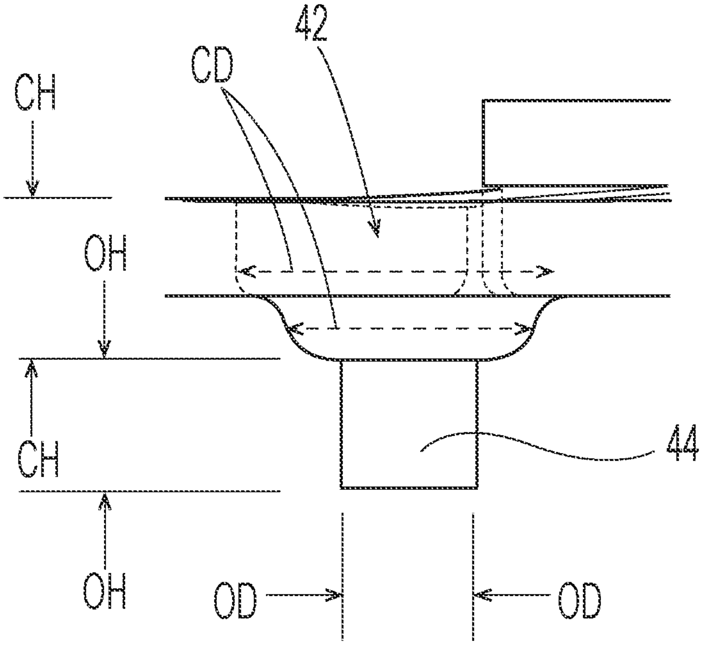
FIG. 23 is a side, elevation view of a radial vane, a swirl chamber, and a discharge orifice of a nozzle.

The supply channel 32 may be defined by a supply channel length $L_{SC}$ that is measured along a central axis of the fluid flow through the supply channel 32 of the manifold 29. The supply channel length $L_{SC}$ is measured from the start of the supply channel 32 and manifold 29 adjacent to the valve stem 20 to the exit of the discharge orifice of nozzle body 27 at the opposite end of the manifold, as shown in FIG. 12. The supply channel length $L_{SC}$ may be at least 20 mm, or at least 23 mm, or at least 25 mm. $L_{SC}$ may be from 15 to 70 mm, from 15 to 60 mm, from 15 to 50 mm, from 15 to 40 mm, from 15 to 35 mm, from 15 to 30 mm, from 15 to 25 mm, from 20 to 70 mm, from 20 to 60 mm, from 20 to 50 mm, from 20 to 40 mm, from 20 to 35 mm, from 20 to 30 mm, from 20 to 25 mm, from 23 to 70 mm, from 23 to 60 mm, from 23 to 50 mm, from 23 to 40 mm, from 23 to 35 mm, from 23 to 30 mm, from 23 to 25 mm, from 25 to 70 mm, from 25 to 60 mm, from 25 to 50 mm, from 25 to 40 mm, from 25 to 35 mm, from 25 to 30 mm, from 30 to 70 mm, from 30 to 60 mm, from 30 to 50 mm, from 30 to 40 mm, from 40 to 70 mm, from 40 to 60 mm, from 40 to 50 mm, from 50 to 70 mm, from 50 to 60 mm, or from 60 to 70 mm. $L_{SC}$ defines the pressure loss through the system. Without intending to be bound by theory, an $L_{SC}$ less than 15 mm is conventionally used in button actuator systems and require increased force from the end user to use for a prolonged period of time. In comparison, it is contemplated that an $L_{SC}$ in the ranges described above result in improved end user experience because less force is required and a longer spray time is achieved. It is contemplated that an $L_{SC}$ greater than 70 mm may lead to higher pressure loss through the channel.

The valve assembly 11 may be disposed on or inserted, at least partially, into the opening 21 of the neck 22 of the container 12, such as illustrated in FIGS. 7 and 8. The valve assembly 11 may include a valve body 19, a valve stem 20, and a resilient member 56 that creates a liquid and/or gas seal between the valve body 19 and the container 12. At least a portion of the valve assembly 11 may be movable in relationship to the balance of the spray dispenser in order to open and close the spray dispenser for dispensing composition. With reference to FIGS. 7-12, the valve assembly 11 may be opened due to movement of the valve stem 20 which may be through use of an actuator 13 or through manual or other mechanical depression of the valve stem 20. When the valve body 19 is opened, for example, by way of the actuator 13, a fluid flow path is created for the composition to be dispensed through a nozzle 14 to ambient or a target surface. The valve assembly 11 may be opened, for example, by selective actuation of the actuator 13 by a user.

Figure 9:
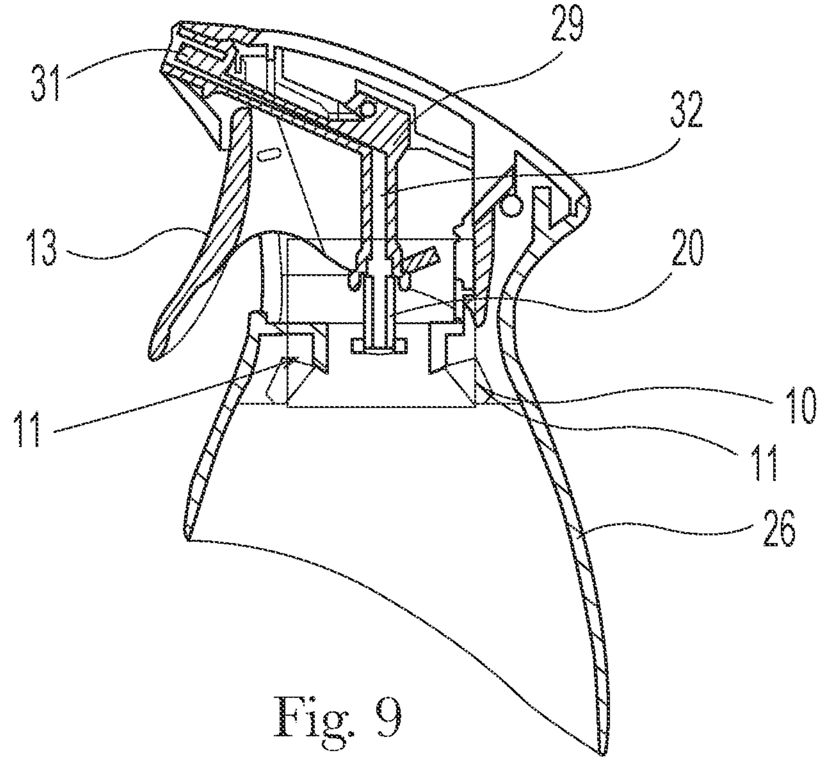
FIG. 9 is a sectional view of a portion of a spray dispenser illustrating a shroud, actuator, valve assembly, and manifold.
Figure 10:
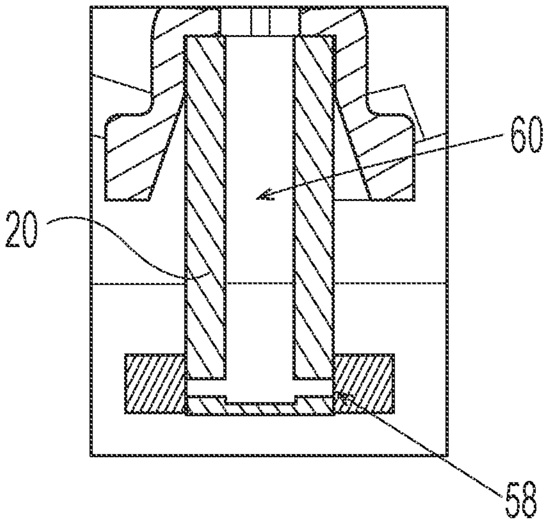
FIG. 10 is a sectional view of a portion of FIG. 9 illustrating a valve stem in a closed position.
Figure 11:
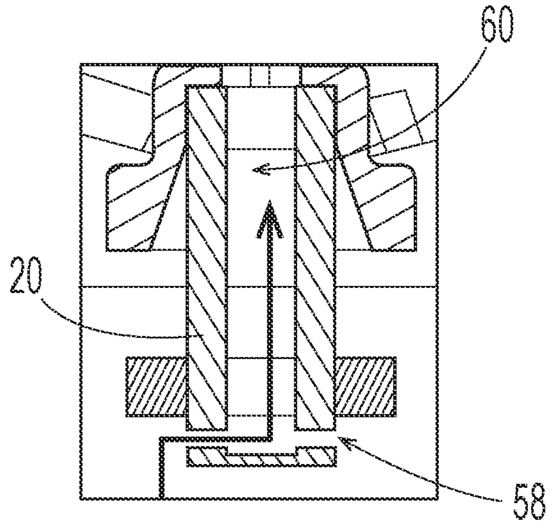
FIG. 11 is a sectional view of a portion of FIG. 9 illustrating a valve stem in a fully open position.

With reference to FIGS. 9-11, a valve stem 20 may extend through the inner passageway 23 of the valve body 19. The valve stem 20 includes a valve stem opening 58 and a valve stem channel 60. The valve stem 20 provides a flow path for the composition from the interior 15 of the container 12 to the supply channel 32. The valve stem 20 is in operative communication with the actuator 13. With reference to FIG. 10, the valve stem 20 may be positioned with respect to the valve body 19 in a closed position such that valve stem 20, and specifically the valve stem opening 58, is not in fluid communication with the composition delivery device 24. The valve stem 20 may be moveable with respect to the valve body 19, for example between a closed position and a fully open position. With reference to FIG. 11, when the valve stem 20 is in the fully open position, the valve stem opening 58 of the valve stem 20 is in fluid communication with the composition delivery device 24. The valve stem 20 may be positioned in other positions as the valve stem 20 moves from the closed position to the fully open position. The valve stem 20 may include a valve stem channel 60 that is in fluid communication with the valve stem opening 58 through which composition and/or propellant may flow out from the container 12.

The valve assembly 11, including the valve body 19 and valve stem 20, may be constructed from any substantially rigid material, such as steel, aluminum, or their alloys, fiberglass, or plastic. However, for economic reasons, each may be composed of polyethylene plastic and formed by injection molding, although other processes such as plastic welding or adhesive connection of appropriate parts are equally applicable.

With reference to FIGS. 12-15, nozzle 14 comprises a nozzle body 27 and a nozzle insert 36. The nozzle body 27 may be integral with the manifold 29 or may be a separate structure that is attached to the manifold 29 by mechanical means. Nozzle body 27 may be provided with a generally cylindrically shaped interior and may have various external configurations or structures which may aid the user in operation of the dispenser (e.g., raised gripping surfaces, depressions for finger placement and the like). The supply channel 32 may extend through the nozzle body 27 for receiving nozzle insert 36. The supply channel 32 may define an inside wall 34. The nozzle insert 36 may be joined with the nozzle body 27 by, for illustrative purposes only, a frictional interference fit between the inside wall 34 and the nozzle insert 36. The frictional connection, more commonly known as a press fit, between nozzle insert 36 and supply channel 32 may be snug but removable to facilitate cleaning or rinsing of debris which may otherwise build up and clog the nozzle.

The corresponding surfaces of supply channel 32 and nozzle insert 36 are provided of appropriate size and material to effectively create a seal therebetween so that there will be generally no liquid flow between the surfaces when the dispenser is in operation. It will be understood by one skilled in the art that nozzle insert 36 may be connected to supply channel 32 by means other than a frictional interference fit such as adhesive connections, welding, mechanical connecting structures (e.g., threads, tabs, slots, ring, or the like), or by integral manufacture with supply annulus.

Nozzle insert 36 is to provide fluid communication with the container 12 so that the composition to be dispensed may be transported from the container 12 to the nozzle 14.

An insert post 31 may be disposed adjacent nozzle insert 36, as best illustrated in FIGS. 12-15. Insert post 31 may have a substantially planar end surface 28 adjacent its distal end, and insert post surface 30. End surface 28 may be generally circular shaped when viewed from the direction indicated by the arrows in FIG. 13. Insert post 31 may be a separate structure which may be attached to nozzle body 27 by a mechanical means (e.g., threaded, press fit or the like), or may be integrally formed with nozzle body 27 for simplicity of manufacture (such as by injection molding). Supply channel 32 generally forms a supply annulus 50 which is bounded by post surface 30 and inside wall 34. The supply channel 32 may be adjacent to and in fluid communication with nozzle insert 36 to initially receive fluid from the container 12.

As best seen in FIGS. 16-23, nozzle insert 36 may be generally cup-shaped, having an outer surface 37, a cavity 38 with a cavity surface 39, and an end face 40. Located adjacent to end face 40 and generally concentric with the centerline of the cavity 38 is a swirl chamber 42, having a chamber diameter CD, a chamber depth CH, and defining a swirl chamber volume.

The chamber diameter CD of the swirl chamber 42 may gradually decrease in size from the vane exit 52 to the discharge orifice 44. This may result in the swirl chamber 42 having a generally conical shape or bowl-shape. The shape of the swirl chamber 42 may contribute to the relatively small volume of the swirl chamber 42 versus a swirl chamber having a bore-shape. Without intending to be bound by theory, the decrease in the CD from the vane exit 52 to the discharge orifice 44 may reduce the presence of dead zones (also known as swirl zones) within the swirl chamber. Dead zones may result from the fast movement of the composition entering from the vane exit 52, moving quickly to the discharge orifice 44, creating a vacuum in conventional swirl chambers having a bore-shape. This vacuum results in lost composition "swirling" in the edge of a conventional bore-shaped swirl chamber, but unable to exit through the discharge orifice 44. In comparison, it is contemplated that the reduced swirl chamber volume, the decreasing CD, or both, prevent dead zones within the swirl chamber 42 of the present disclosure.

A discharge orifice 44 having an orifice diameter OD and orifice depth OH is located adjacent to and generally concentric with swirl chamber 42. Discharge orifice 44 thereby provides fluid communication between swirl chamber 42 and the ambient environment. As best illustrated in FIGS. 16-20, a plurality of grooves 46 may be disposed on end face 40 extending generally radially inward from cavity surface 39 to swirl chamber 42. Each groove 46 connects generally tangentially with swirl chamber 42 and nozzle insert 36. The nozzle insert 36 may include two or more spaced grooves 46. Nozzle insert 36 may have three grooves 46 disposed generally radially and equidistant about swirl chamber 42. Nozzle insert 36 may have two, three, four, or more than four grooves 46.

When nozzle insert 36 has been fully assembled with inside wall 34 of nozzle body 27 such that end surface 28 and end face 40 are in contact (as best illustrated in FIGS. 13-15 and 21-23), a plurality of radial vanes 48 and the supply annulus 50 are defined. Supply annulus 50 is formed between cavity surface 39 and post surface 30, and extends along at least a portion of the length of cavity surface 39 such that supply annulus 50 is in fluid communication with the one or more radial vanes 48. Radial vanes 48 may be defined by the juxta position of end surface 28 of insert post 31 and grooves 46 of nozzle insert 36. The radial vane(s) 48 may be defined by a radial vane depth VH. The nozzle insert 36 may define a nozzle longitudinal axis NL.

The swirl chamber 42 may be defined by a chamber diameter CD of less than or equal to 900 microns, or less than or equal to 800 microns, or less than or equal to 750 microns, or less than or equal to 700 microns. It is contemplated that swirl chambers that have a greater CD may take a longer time to stop swirling the composition within the swirl chamber upon actuator release as compared to swirl chambers with a lesser CD. When the composition continues swirling longer within the swirl chamber, it is contemplated that this leads to large droplet formation.

The swirl chamber 42 may be defined by a swirl chamber depth CH of less than or equal to 500 microns, or less than or equal to 450 microns, or less than or equal to 400 microns. It is contemplated that swirl chambers that have a greater CH may take a longer time to stop swirling the composition within the swirl chamber upon actuator release as compared to swirl chambers with a lesser CH. When the composition continues swirling longer within the swirl chamber, it is contemplated that this leads to large droplet formation.

The swirl chamber 42 may be defined by a swirl chamber volume in the range of about 0.095 $mm^3$ to about 0.277 $mm^3$, or about 0.095 $mm^3$ to about 0.135 $mm^3$. It is contemplated that swirl chambers that have a greater swirl chamber volume may take a longer time to stop swirling the composition within the swirl chamber upon actuator release as compared to swirl chambers with a lesser swirl chamber volume. When the composition continues swirling longer within the swirl chamber, it is contemplated that this leads to large droplet formation.

The discharge orifice 44 may be defined by an orifice diameter OD of less than or equal to 350 microns, or less than or equal to 270 microns. The discharge orifice may be defined by an orifice depth OH of less than or equal to 400 microns, or less than or equal to 350 microns, or at least 300 microns. It is contemplated that an OD greater than 400 microns may lead to large droplet sizes having a Dv90 particle size of greater than 100 microns.

A ratio of chamber diameter CD to orifice diameter OD may be greater than about 1, or greater than about 2.

The radial vane depth VH may be less than the chamber depth CH as the radial vane feeds into the chamber. For example, the radial vane depth may be less than 500 microns, or less than 400 microns, or less than 350 microns, or less than 300 microns, or less than 250 microns.

Nozzle body 27 and nozzle insert 36 may be constructed from any substantially rigid material, such as steel, aluminum, or their alloys, fiberglass, or plastic. However, for economic reasons, each may be composed of polyethylene plastic and formed by injection molding, although other processes such as plastic welding or adhesive connection of appropriate parts are equally applicable.

In operation of the spray dispenser 10, a user applies pressure to the actuator 13, which operates the valve assembly 11 to allow the composition from the container to flow through the valve assembly 11 and to the nozzle 14. When the actuator 13 is fully actuated, the valve stem is in the fully open position and a fluid flow path is formed from the container 12 and through the nozzle 14. The pressure of the propellant forces the composition from the container, through the composition delivery device 24, through the valve stem 20, and to the supply channel 32 of the manifold 29. From the supply channel 32, the composition travels into the nozzle 14, through the supply annulus 50, into the vane inlet 54, through the vane exit 52, into the swirl chamber 42, and finally through the discharge orifice 44.

More specifically, the composition, upon exiting the supply channel 32, may longitudinally traverses nozzle body 27 and enter supply annulus 50. The pressurized composition then passes through supply annulus 50 and is directed into the plurality of radial vanes 48. Although it is preferred that nozzle insert 36, supply channel 32 and supply annulus 50 cooperate to transport the liquid from the container to the plurality of vanes 48, it should be understood that other supply structures (e.g., channels, chambers, reservoirs etc.) may be equally suitable singly or in combination for this purpose. The composition is directed radially inward toward swirl chamber 42. The composition preferably exits the radial vanes 48 generally tangentially into swirl chamber 42, and the rotational energy imparted to the liquid by each radial vane 48 and the tangential movement into swirl chamber 42 generally creates a low pressure region adjacent the center of swirl chamber 42. This low pressure region will tend to cause ambient air or gas to penetrate into the core of swirl chamber 42. The composition then exits swirl chamber 42 as a thin liquid film (surrounding aforementioned air core) and is directed through discharge orifice 44 to the ambient environment. Upon discharge, inherent instabilities in the liquid film cause the composition to break into ligaments and then discrete particles or droplets, thus forming a spray.

Upon release of the actuator, where the actuator is moving from a fully actuated position to a resting position, the valve stem moves from the fully open position to the closed position. Once the valve stem is no longer in fluid communication with the container, the composition that remains in the supply channel 32, supply annulus 50, radial vanes 48, swirl chamber 42, and discharge orifice 44 continue to exit the discharge 44 until the initial momentum fades to a state that is is no longer able to force composition out the discharge orifice 44.

The nozzle of the present disclosure is capable of dispensing droplets of composition that are substantially uniform in size during a full actuation by a user. For example, when the actuator is in the fully actuated position, the droplets of composition exiting the nozzle are of substantially the same size as the droplets of composition that exit the nozzle when the actuator is released and returning to the resting position. In order to characterize the droplet size of the droplets exiting the nozzle over a single actuation, the following Dv90 values are defined. A fully open minimum Dv90 particle size is the minimum value reported from the Dv90 Particle Size Test Method provided below when the actuator is fully actuated and the valve stem is in the fully open position in the first 350 milliseconds (ms) of the actuation. The fully open maximum Dv90 particle size is the maximum value reported when the actuator is fully actuated and the valve stem is in the fully open position in the first 350 milliseconds of the actuation. The fully open Dv90 particle size range is equal to the difference between the fully open maximum Dv90 particle size and the fully open minimum Dv90 particle size. The minimum Dv90 particle size is the minimum reported value over the full 400 ms spray. The closing maximum Dv90 particle size is the maximum value reported in the last 50 ms after the initial 350 ms actuation when the actuator is moving from the fully actuated position to the closed position and the valve stem is moving from the fully open position to the closed position. The ratio of Dv90 particle sizes is the ratio of the closing maximum Dv90 particle size to the fully open minimum Dv90 particle size.

The fully open minimum Dv90 particle size may be in the range of about 60 microns to about 100 microns, or about 70 microns to about 90 microns. The fully open maximum Dv90 particle size may be in the range of about 60 microns to about 100 microns, or about 80 microns to about 100 microns. The fully open Dv90 particle size range may be less than 15 microns, or may be less than 10 microns. The minimum Dv90 particle size may be in the range of about 60 microns to about 100 microns, or about 70 microns to about 90 microns. The closing maximum Dv90 particle size may be in the range of about 60 microns to about 100 microns, or about 80 microns to about 100 microns. It is contemplated that particles having a particle size greater than 100 microns have a higher probability of falling relatively quicker to the floor and taking a relatively longer time to evaporate leading to undesirable consumer experience on floor wetness as compared to particles having a particle size less than 100 microns. A ratio of the closing maximum Dv90 particle to the minimum Dv90 particle size may be less than 5, or less than 4, or less than 3, or less than 2, or less than 1.5. The ratio may be from 0.01 to 5, from 0.01 to 4, from 0.01 to 3, from 0.01 to 2, from 0.01 to 1.5, from 0.1 to 5, from 0.1 to 4, from 0.1 to 3, from 0.1 to 2, from 0.1 to 1.5, from 0.5 to 5, from 0.5 to 4, from 0.5 to 3, from 0.5 to 2, from 0.5 to 1.5, from 0.75 to 5, from 0.75 to 4, from 0.75 to 3, from 0.75 to 2, from 0.75 to 1.5, from 1 to 5, from 1 to 4, from 1 to 3, from 1 to 2, from 1 to 1.5, or about 1.15. This ratio describes the consistency of spray between start and stop of the spray. It is contemplated that a ratio of greater than 5 correlates to relatively large particle size such as greater than 500 microns that could lead to greater deposition.

From a full container with the full amount of composition initially charged into the container until the container contains 75% of the initial amount of composition charged to the container, the ratio of the closing maximum Dv90 particle to the minimum Dv90 particle size may be less than 5, or less than 4, or less than 3, or less than 2, or less than 1.5. The ratio may be from 0.01 to 5, from 0.01 to 4, from 0.01 to 3, from 0.01 to 2, from 0.01 to 1.5, from 0.1 to 5, from 0.1 to 4, from 0.1 to 3, from 0.1 to 2, from 0.1 to 1.5, from 0.5 to 5, from 0.5 to 4, from 0.5 to 3, from 0.5 to 2, from 0.5 to 1.5, from 0.75 to 5, from 0.75 to 4, from 0.75 to 3, from 0.75 to 2, from 0.75 to 1.5, from 1 to 5, from 1 to 4, from 1 to 3, from 1 to 2, from 1 to 1.5, or about 1.15.

Flow rate is determined by measuring the rate of composition expelled by a container for any 10 seconds period of use. The flow rate of the composition being released from the spray dispenser may be from about 0.0001 grams/second (g/s) to about 2.5 g/s. Alternatively, the flow rate may be from about 0.001 g/s to about 1.9 grams/second, or about 0.01 g/s to about 1.6 g/s. It is contemplated that a flow rate of greater than 2.5 g/s would generate larger particle sizes than flow rates less than 2.5 g/s.

The cone angle may be greater than about 20 degrees, or greater than about 30 degrees, or greater than about 35 degrees, or greater than about 40 degrees, or greater than about 50 degrees.

Figure 2:
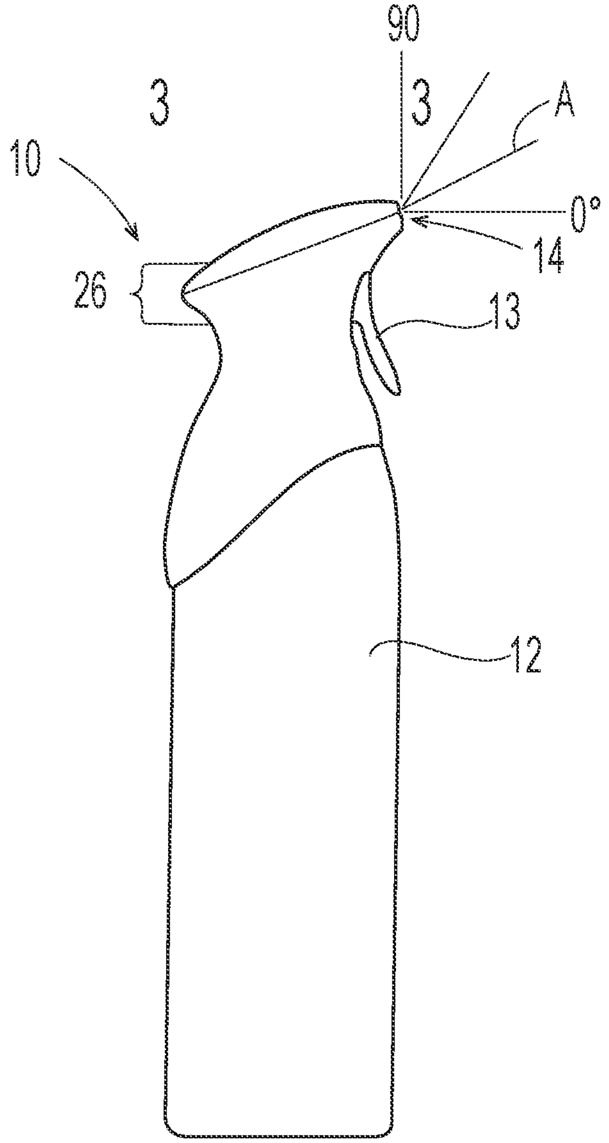
FIG. 2 is a side, elevation view of a spray dispenser.
Figure 3:
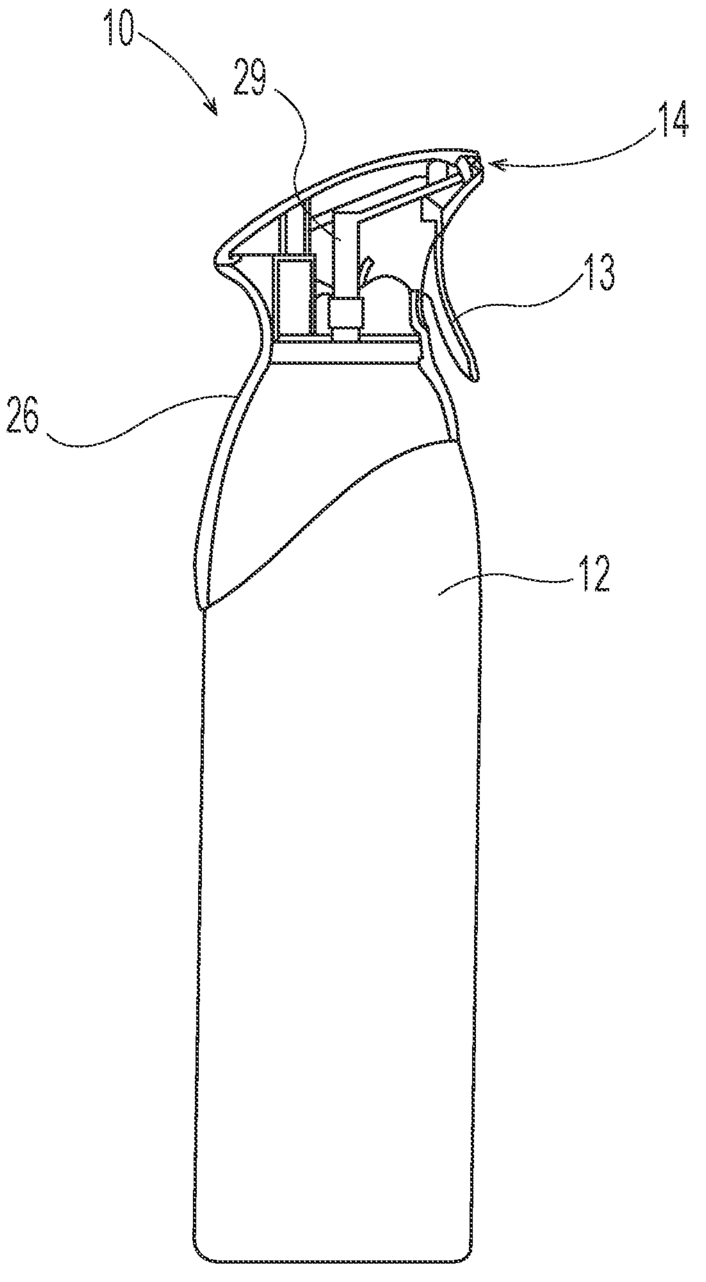
FIG. 3. is a sectional view of the spray dispenser of FIG. 2.
Figure 4:
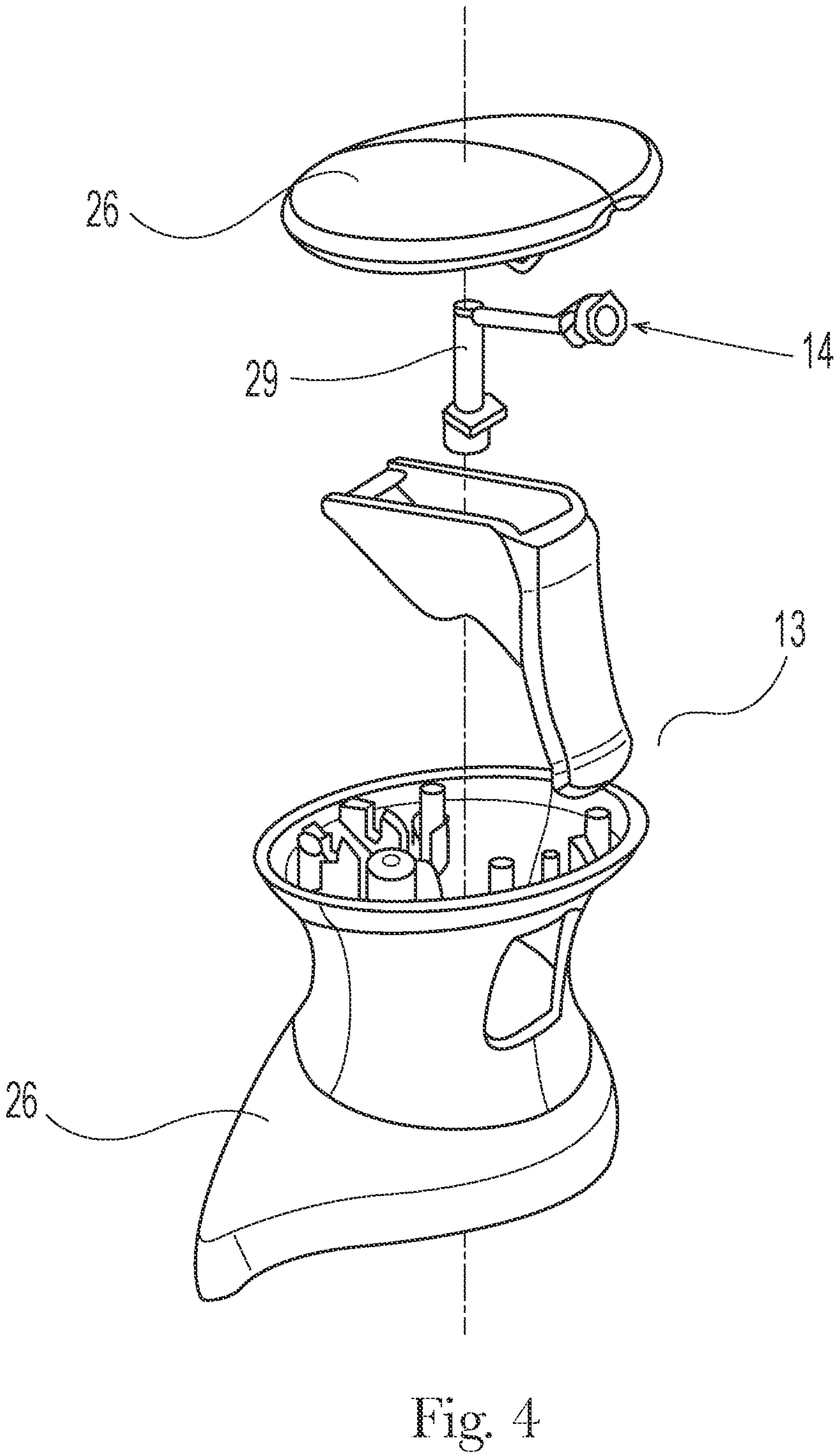
FIG. 4 is a side, elevation view of a spray dispenser having a push-button actuator and a base cup.
Figure 5:
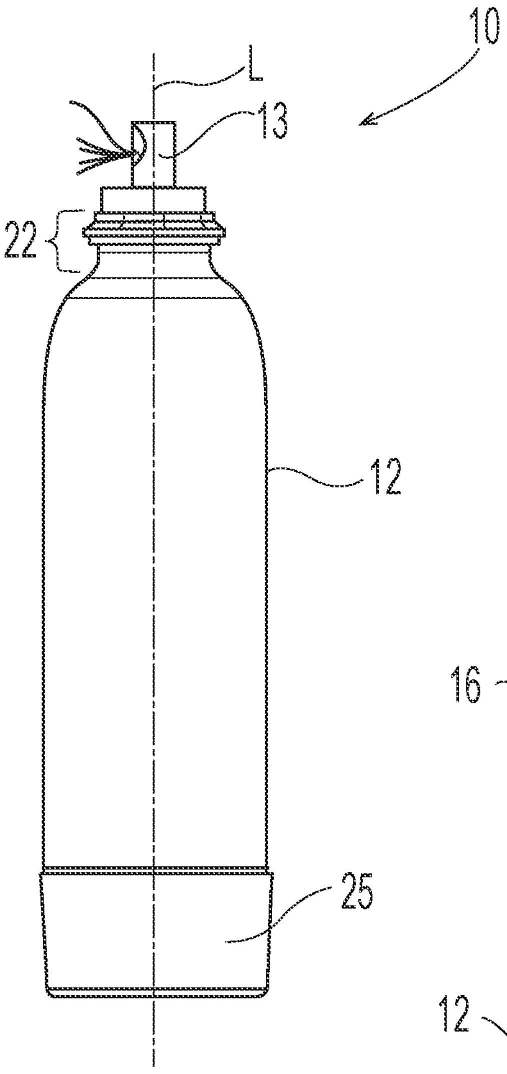
FIG. 5 is a side, elevation view of a spray dispenser without an actuator or base cup.
Figure 6:
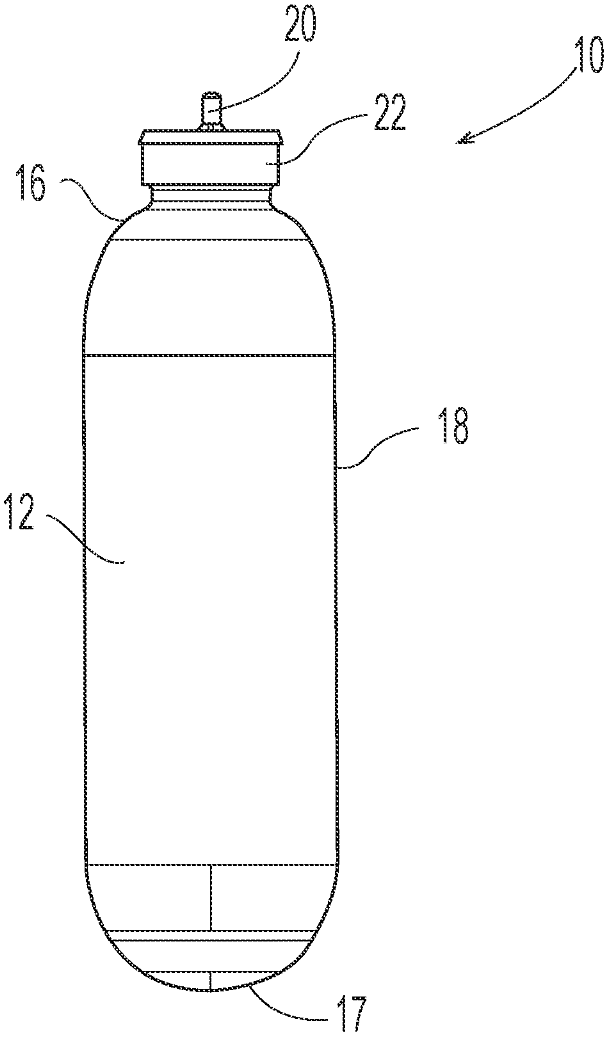
FIG. 6 is a sectional view of FIG. 5 having a composition delivery device in the form of a bag.

With reference to FIG. 2, the spray dispenser may be configured to spray the composition at an angle that is between an angle that is parallel to the base of the container and an angle A that is perpendicular thereto.

The composition may also be formulated for use in personal care products such as skin moisturizers, body deodorants, facial and body cleansers, baby wipes; surface care compositions such as hard surface cleaners, wood polishes, and automobile cleaners; fabric care compositions such as cleaners, softeners, de-wrinklers, and refreshers; and air compositions including aerosols and sprays.

The spray dispensers may be used to freshen the air, surfaces, fabrics, and/or combinations thereof.

Composition

The composition may be a liquid composition. The composition may be an air freshening and/or fabric freshening composition, a hard surface composition, a dish composition, an insect repellant composition, a disinfecting composition, a hair care composition, a body care composition, an antiperspirant or deodorant or the like. The composition may be an air and/or fabric freshening composition.

The composition may include a perfume mixture comprising at least one perfume raw materials (PRMs). Various PRMs may be used. The composition may include a perfume mixture comprising one or more of the following perfume raw materials. As used herein, a "perfume raw material" refers to one or more of the following ingredients: fragrant essential oils; aroma compounds; pro-perfumes; materials supplied with the fragrant essential oils, aroma compounds, and/or pro-perfumes, including stabilizers, diluents, processing agents, and contaminants; and any material that commonly accompanies fragrant essential oils, aroma compounds, and/or pro-perfumes.

The PRM may include one or more ketones. The PRM comprising ketone can comprise any PRMs which contain one or more ketone moieties and which can impart a desirable scent. The PRM may comprise ketone comprising a PRM selected from the group consisting of buccoxime; iso jasmone; methyl beta naphthyl ketone; musk indanone; tonalid/musk plus; alpha-damascone, beta-damascone, delta-damascone, iso-damascone, damascenone, damarose, methyl-dihydrojasmonate, menthone, carvone, camphor, fenchone, alpha-ionone, beta-ionone, dihydro-beta-ionone, gamma-methyl so-called ionone, fleuramone, dihydrojasmone, cis-jasmone, iso-e-super, methyl-cedrenyl-ketone or methyl-cedrylone, acetophenone, methyl-acetophenone, para-methoxy-acetophenone, methyl-beta-naphtyl-ketone, benzyl-acetone, benzophenone, para-hydroxy-phenyl-butanone, celery ketone or livescone, 6-isopropyldecahydro-2-naphtone, dimethyl-octenone, freskomenthe, 4-(1-ethoxyvinyl)-3,3,5,5,-tetramethyl-cyclohexanone, methyl-heptenone, 2-(2-(4-methyl-3-cyclohexen-1-yl)propyl)-cyclopentanone, 1-(p-menthen-6(2)-yl)-1-propanone, 4-(4-hydroxy-3-methoxyphenyl)-2-butanone, 2-acetyl-3,3-dimethyl-norbornane, 6,7-dihydro-1,1,2,3,3-pentamethyl-4(5h)-indanone, 4-damascol, dulcinyl or cassione, gelsone, hexalon, isocyclemone e, methyl cyclocitrone, methyl-lavender-ketone, orivon, para-tertiary-butyl-cyclohexanone, verdone, delphone, muscone, neobutenone, plicatone, veloutone, 2,4,4,7-tetramethyl-oct-6-en-3-one, tetrameran, hedione, floralozone, gamma undecalactone, ethylene brassylate, pentadecanolide, methyl nonyl ketone, cyclopentadecanone, cyclic ethylene dodecanedioate, 3,4,5,6-tetrahydropseudoionone, 8-hexadecenolide, dihydrojasmone, 5-cyclohexadecenone, and a combination thereof.

The PRM comprising ketone comprises a PRM selected from the group consisting of alpha-damascone, delta-damascone, iso-damascone, carvone, gamma-methyl-ionone, beta-ionone, iso-e-super. 2,4,4,7-tetramethyl-oct-6-en-3-one, benzyl acetone, beta-damascone, damascenone, methyl dihydrojasmonate, methyl cedrylone, hedione, floralozone, and a combination thereof. Preferably, the PRM comprising ketone comprises delta-damascone.

The composition may include a mixture of aldehydes that contribute to scent character and neutralize malodors in vapor and/or liquid phase via chemical reactions. Aldehydes that are partially reactive or volatile may be considered a reactive aldehyde as used herein. Reactive aldehydes may react with amine-based odors, following the path of Schiff-base formation. Reactive aldehydes may also react with sulfur-based odors, forming thiol acetals, hemi thiolacetals, and thiol esters in vapor and/or liquid phase. It may be desirable for these vapor and/or liquid phase reactive aldehydes to have virtually no negative impact on the desired perfume character, color or stability of a product.

The composition may include a mixture of aldehydes that are partially volatile which may be considered a volatile aldehyde as used herein. The volatile aldehydes may also have a certain boiling point (B.P.) and octanol/water partition coefficient (P). The boiling point referred to herein is measured under normal standard pressure of 760 mmHg. The boiling points of many volatile aldehydes, at standard 760 mm Hg are given in, for example, "Perfume and Flavor Chemicals (Aroma Chemicals)," written and published by Steffen Arctander, 1969.

The octanol/water partition coefficient of a volatile aldehyde is the ratio between its equilibrium concentrations in octanol and in water. The partition coefficients of the volatile aldehydes used in the malodor control composition may be more conveniently given in the form of their logarithm to the base 10, log P. The log P values of many volatile aldehydes have been reported. See, e.g., the Pomona92 database, available from Daylight Chemical Information Systems, Inc. (Daylight CIS), Irvine, California. However, the log P values are most conveniently calculated by the "C LOG P" program, also available from Daylight CIS. This program also lists experimental log P values when they are available in the Pomona92 database. The "calculated log P" (C log P) is determined by the fragment approach of Hansch and Leo (cf., A. Leo, in Comprehensive Medicinal Chemistry, Vol.

4, C. Hansch, P. G. Sammens, J. B. Taylor and C. A. Ramsden, Eds., p. 295, Pergamon Press, 1990). The fragment approach is based on the chemical structure of each volatile aldehyde, and takes into account the numbers and types of atoms, the atom connectivity, and chemical bonding. The C log P values, which are the most reliable and widely used estimates for this physicochemical property, are preferably used instead of the experimental log P values in the selection of volatile aldehydes for the malodor control composition.

The C log P values may be defined by four groups and the volatile aldehydes may be selected from one or more of these groups. The first group comprises volatile aldehydes that have a B.P. of about 250° C.or less and C log P of about 3 or less. The second group comprises volatile aldehydes that have a B.P. of 250° C. or less and C log P of 3.0 or more. The third group comprises volatile aldehydes that have a B.P. of 250° C. or more and C log P of 3.0 or less. The fourth group comprises volatile aldehydes that have a B.P. of 250° C. or more and C log P of 3.0 or more. The malodor control composition may comprise any combination of volatile aldehydes from one or more of the C log P groups.

The malodor control composition may comprises, by total weight of the composition, from about 0% to about 30% of volatile aldehydes from group 1, alternatively about 25%; and/or about 0% to about 10% of volatile aldehydes from group 2, alternatively about 10%; and/or from about 10% to about 30% of volatile aldehydes from group 3, alternatively about 30%; and/or from about 35% to about 60% of volatile aldehydes from group 4, alternatively about 35%.

Exemplary reactive and/or volatile aldehydes which may be used in a composition include, but are not limited to, Adoxal (2,6,10-Trimethyl-9-undecenal), Bourgeonal (4-t-butylbenzenepropionaldehyde), Lilestralis 33 (2-methyl-4-t-butylphenyl)propanal), Cinnamic aldehyde, cinnamaldehyde (phenyl propenal, 3-phenyl-2-propenal), Citral, Geranial, Neral (dimethyloctadienal, 3,7-dimethyl-2,6-octadien-1-al), Cyclal C (2,4-dimethyl-3-cyclohexen-1-carbaldehyde), Florhydral (3-(3-Isopropyl-phenyl)-butyraldehyde), Citronellal (3,7-dimethyl 6-octenal), Cymal, cyclamen aldehyde, Cyclosal, Lime aldehyde (Alpha-methyl-p-isopropyl phenyl propyl aldehyde), Methyl Nonyl Acetaldehyde, aldehyde C12 MNA (2-methyl-1-undecanal), Hydroxycitronellal, citronellal hydrate (7-hydroxy-3,7-dimethyl octan-1-al), Helional (3-(1,3-Benzodioxol-5-yl)-2-methylpropanal; 2-Methyl-3-(3,4-methylenedioxyphenyl) propanal), Intreleven aldehyde (undec-10-en-1-al), Ligustral, Trivertal (2,4-dimethyl-3-cyclohexene-1-carboxaldehyde), Jasmorange, satinaldehyde (2-methyl-3-tolyl-proionaldehyde, 4-dimethylbenzenepropanal), Lyral (4-(4-hydroxy-4-methyl pentyl)-3-cyclohexene-1-carboxaldehyde), Melonal (2,6-Dimethyl-5-Heptenal), Methoxy Melonal (6-methoxy-2,6-dimethylheptanal), methoxycinnamaldehyde (trans-4-methoxycinnamaldehyde), Myrac aldehyde isohexenyl cyclohexenyl-carboxaldehyde, trifernal ((3-methyl-4-phenyl propanal, 3-phenyl butanal), lilial, P.T. Bucinal, lysmeral, benzenepropanal (4-tert-butyl-alpha-methyl-hydrocinnamaldehyde), Dupical, tricyclodecylidenebutanal (4-Tricyclo5210-2,6decylidene-8butanal), Melafleur (1,2,3,4,5,6,7,8-octahydro-8,8-dimethyl-2-naphthaldehyde), Methyl Octyl Acetaldehyde, aldehyde C-11 MOA (2-mchtyl deca-1-al), Onicidal (2,6,10-trimethyl-5,9-undecadien-1-al), Citronellyl oxyacetaldehyde, Muguet aldehyde 50 (3,7-dimethyl-6-octenyl) oxyacetaldehyde), phenylacetaldehyde, Mefranal (3-methyl-5-phenyl pentanal), Triplal, Vertocitral dimethyl tetrahydrobenzene aldehyde (2,4-dimethyl-3-cyclohexene-1-carboxaldehyde), 2-phenylproprionaldehyde, Hydrotropaldehyde, Canthoxal, anisylpropanal 4-methoxy-alpha-methyl benzenepropanal (2-anisylidene propanal), Cylcemone A (1,2,3,4,5,6,7,8-octahydro-8,8-dimethyl-2-naphthaldehyde), and Precylcemone B (1-cyclohexene-1-carboxaldehyde).

Still other exemplary aldehydes include, but are not limited to, acetaldehyde (ethanal), pentanal, valeraldehyde, amylaldehyde, Scentenal (octahydro-5-methoxy-4,7-Methano-1H-indene-2-carboxaldehyde), propionaldehyde (propanal), Cyclocitral, beta-cyclocitral, (2,6,6-trimethyl-1-cyclohexene-1-acetaldehyde), Iso Cyclocitral (2,4,6-trimethyl-3-cyclohexene-1-carboxaldehyde), isobutyraldehyde, butyraldehyde, isovaleraldehyde (3-methyl butyraldehyde), methylbutyraldehyde (2-methyl butyraldehyde, 2-methyl butanal), Dihydrocitronellal (3,7-dimethyl octan-1-al), 2-Ethylbutyraldehyde, 3-Methyl-2-butenal, 2-Methylpentanal, 2-Methyl Valeraldehyde, Hexenal (2-hexenal, trans-2-hexenal), Heptanal, Octanal, Nonanal, Decanal, Lauric aldehyde, Tridecanal, 2-Dodecanal, Methylthiobutanal, Glutaraldehyde, Pentanedial, Glutaric aldehyde, Heptenal, cis or trans-Heptenal, Undecenal (2-, 10-), 2,4-octadienal, Nonenal (2-, 6-), Decenal (2-, 4-), 2,4-hexadienal, 2,4-Decadienal, 2,6-Nonadienal, Octenal, 2,6-dimethyl 5-heptenal, 2-isopropyl-5-methyl-2-hexenal, Trifernal, beta methyl Benzenepropanal, 2,6,6-Trimethyl-1-cyclohexene-1-acetaldehyde, phenyl Butenal (2-phenyl 2-butenal), 2.Methyl-3(p-isopropylphenyl)-propionaldehyde, 3-(p-isopropylphenyl)-propionaldehyde, p-Tolylacetaldehyde (4-methylphenylacetaldehyde), Anisaldehyde (p-methoxybenzene aldehyde), Benzaldehyde, Vernaldehyde (1-Methyl-4-(4-methylpentyl)-3-cyclohexenecarbaldehyde), Heliotropin (piperonal) 3,4-Methylene dioxy benzaldehyde, alpha-Amylcinnamic aldehyde, 2-pentyl-3-phenylpropenoic aldehyde, Vanillin (4-methoxy 3-hydroxy benzaldehyde), Ethyl vanillin (3-ethoxy 4-hydroxybenzaldehyde), Hexyl Cinnamic aldehyde, Jasmonal H (alpha-n-hexyl-cinnamaldehyde), Floralozone, (para-ethyl-alpha,alpha-dimethyl Hydrocinnamaldehyde), Acalea (p-methyl-alpha-pentylcinnamaldehyde), methylcinnamaldehyde, alpha-Methylcinnamaldehyde (2-methyl 3-pheny propenal), alpha-hexylcinnamaldehyde (2-hexyl 3-phenyl propenal), Salicylaldehyde (2-hydroxy benzaldehyde), 4-ethyl benzaldehyde, Cuminaldehyde (4-isopropyl benzaldehyde), Ethoxybenzaldehyde, 2,4-dimethylbenzaldehyde, Veratraldehyde (3,4-dimethoxybenzaldehyde), Syringaldehyde (3,5-dimethoxy 4-hydroxybenzaldehyde), Catechaldehyde (3,4-dihydroxybenzaldehyde), Safranal (2,6,6-trimethyl-1,3-diene methanal), Myrtenal (pin-2-ene-1-carbaldehyde), Perillaldehyde L-4(1-methylethenyl)-1-cyclohexene-1-carboxaldehyde), 2,4-Dimethyl-3-cyclohexene carboxaldehyde, 2-Methyl-2-pentenal, 2-methylpentenal, pyruvaldehyde, formyl Tricyclodecan, Mandarin aldehyde, Cyclemax, Pino acetaldehyde, Corps Iris, Maceal, and Corps 4322.

The composition may comprise polyols. Low molecular weight polyols with relatively high boiling points, as compared to water, such as ethylene glycol, diethylene glycol, triethylene glycol, propylene glycol, dipropylene glycol, and/or glycerine may be utilized as a malodor counteractant for improving odor neutralization of the composition. Some polyols, e.g., dipropylene glycol, are also useful to facilitate the solubilization of some perfume ingredients in the composition.

The glycol may be glycerine, ethylene glycol, propylene glycol, dipropylene glycol, polyethylene glycol, propylene glycol methyl ether, propylene glycol phenyl ether, propylene glycol methyl ether acetate, dipropylene glycol methyl ether acetate, propylene glycol n-butyl ether, dipropylene glycol n-butyl ether, dipropylene glycol n-propyl ether, ethylene glycole phenyl ether, diethylene glycol n-butyl ether, dipropylene glycol n-butyl ether, diethylene glycol mono butyl ether, dipropylene glycol methyl ether, tripropylene glycol methyl ether, tripropylene glycol n-butyl ether, other glycol ethers, or mixtures thereof. The glycol used may be ethylene glycol, propylene glycol, or mixtures thereof. The glycol used may be diethylene glycol.

A low molecular weight polyol may be added to the composition at a level of from about 0.01% to about 5%, by weight of the composition, alternatively from about 0.05% to about 1%, alternatively from about 0.1% to about 0.5%, by weight of the composition. Compositions with higher concentrations may make fabrics susceptible to soiling and/or leave unacceptable visible stains on fabrics as the solution evaporates off of the fabric. The weight ratio of low molecular weight polyol to the malodor binding polymer is from about 500:1 to about 4:1, alternatively from about 1:100 to about 25:1, alternatively from about 1:50 to about 4:1, alternatively about 4:1.

The composition may include solubilized, water-soluble, uncomplexed cyclodextrin. As used herein, the term "cyclodextrin" includes any of the known cyclodextrins such as unsubstituted cyclodextrins containing from six to twelve glucose units, especially alpha-cyclodextrin, beta-cyclodextrin, gamma-cyclodextrin and/or their derivatives and/or mixtures thereof. The alpha-cyclodextrin consists of six glucose units, the beta-cyclodextrin consists of seven glucose units, and the gamma-cyclodextrin consists of eight glucose units arranged in a donut-shaped ring. The specific coupling and conformation of the glucose units give the cyclodextrins a rigid, conical molecular structure with a hollow interior of a specific volume. The "lining" of the internal cavity is formed by hydrogen atoms and glycosidic bridging oxygen atoms, therefore this surface is fairly hydrophobic. The unique shape and physical-chemical property of the cavity enable the cyclodextrin molecules to absorb (form inclusion complexes with) organic molecules or parts of organic molecules which can fit into the cavity. Many perfume molecules can fit into the cavity.

Cyclodextrin molecules are described in U.S. Pat. Nos. 5,714,137, and 5,942,217. Cyclodextrin, if present, may be present at from about 0.1% to about 5%, alternatively from about 0.2% to about 4%, alternatively from about 0.3% to about 3%, alternatively from about 0.4% to about 2%, by weight of the composition. Compositions with higher concentrations can make fabrics susceptible to soiling and/or leave unacceptable visible stains on fabrics as the solution evaporates off of the fabric. The latter is especially a problem on thin, colored, synthetic fabrics. In order to avoid or minimize the occurrence of fabric staining, the fabric may be treated at a level of less than about 5 mg of cyclodextrin per mg of fabric, alternatively less than about 2 mg of cyclodextrin per mg of fabric.

The composition may include a buffering agent. The buffering agent may be an acidic buffering agent. The buffering agent may be a dibasic acid, carboxylic acid, or a dicarboxylic acid. The carboxylic acid may be, for example, citric acid, polyacrylic acid, or maleic acid. The acid may be sterically stable. The acid may be used in the composition for maintaining the desired pH. The composition may have a pH from about 4 to about 11, alternatively from about 4 to about 9, alternatively from about 4 to about 6.9, alternatively about 4 to about 7.

The buffer system may comprise one or more buffering agents selected from the group consisting of: citric acid, maleic acid, polyacrylic acid, and combinations thereof. It has been found that buffer systems that include a buffering agent selected from the group consisting of: citric acid, maleic acid, polyacrylic acid, and combinations thereof provide stable compositions with prolonged shelf life.

The buffer system may comprise citric acid and sodium citrate. It has been found that buffer systems comprising citric acid and sodium citrate provide stable compositions with a prolonged shelf life.

Other suitable buffering agents for the compositions include biological buffering agents. Some examples are nitrogen-containing materials, sulfonic acid buffers like 3-(N-morpholino)propanesulfonic acid (MOPS) or N-(2-Acetamido)-2-aminoethanesulfonic acid (ACES), which have a near neutral 6.2 to 7.5 pKa and provide adequate buffering capacity at a neutral pH. Other examples are amino acids such as lysine or lower alcohol amines like mono-, di-, and tri-ethanolamine or methyldiethanolamine or derivatives thereof. Other nitrogen-containing buffering agents are tri(hydroxymethyl)amino methane (HOCH2)3CNH3 (TRIS), 2-amino-2-ethyl-1,3-propanediol, 2-amino-2-methyl-propanol, 2-amino-2-methyl-1,3-propanol, disodium glutamate, N-methyl diethanolamide, 2-dimethyl-amino-2-methylpropanol (DMAMP), 1,3-bis (methylamine)-cyclohexane, 1,3-diamino-propanol N,N'-tetra-methyl-1,3-diamino-2-propanol, N,N-bis(2-hydroxyethyl)glycine (bicine) and N-tris (hydroxymethyl) methyl glycine (tricine). Mixtures of any of the above are also acceptable.

The composition may include a secondary or tertiary amine. If a secondary or tertiary amine is present, the composition may have a weight ratio of sulfur-containing pro-perfume to secondary or tertiary amine of about 1:1, alternatively the weight of pro-perfume should be equal or higher than the weight of the amine, based on the total weight of the composition. If a secondary or tertiary amine is present, the weight ratio of acidic buffering agent to secondary or tertiary amine may be equal to or greater than 3:1, or greater than 5:1, or greater than 6:1.

The composition may be free of primary amines. Without being bound to theory, it is believed that primary amines inhibit the sulfur-containing pro-perfume reaction with the unstable perfume raw materials.

The compositions may contain at least about 0%, alternatively at least about 0.001%, alternatively at least about 0.01%, by weight of the composition, of a buffering agent. The composition may also contain no more than about 1%, alternatively no more than about 0.75%, alternatively no more than about 0.5%, by weight of the composition, of a buffering agent.

The composition may contain a solubilizing aid to solubilize any excess hydrophobic organic materials, particularly any PRMs, and also optional ingredients (e.g., insect repelling agent, antioxidant, etc.) which can be added to the composition, that are not readily soluble in the composition, to form a clear solution. A suitable solubilizing aid is a surfactant, such as a no-foaming or low-foaming surfactant. Suitable surfactants are anionic surfactants, nonionic surfactants, cationic surfactants, amphoteric surfactants, zwitterionic surfactants, and mixtures thereof.

The composition may contain nonionic surfactants, cationic surfactants, and mixtures thereof. The composition may contain surfactant derivatives of hydrogenated castor oil. Suitable ethoxylated hydrogenated castor oils that may be used in the present composition include BASOPHOR™, available from BASF, and CREMOPHOR™, available from Sigma Aldrich.

When the solubilizing agent is present, it may be present at a level of from about 0.01% to about 3%, alternatively from about 0.05% to about 1%, alternatively from about 0.01% to about 0.05%, by weight of the composition.

The composition may include an effective amount of a compound for reducing microbes in the air or on inanimate surfaces. Antimicrobial compounds are effective on gram negative and gram positive bacteria and fungi typically found on indoor surfaces that have contacted human skin or pets such as couches, pillows, pet bedding, and carpets. Such microbial species include *Klebsiella pneumoniae, Staphylococcus aureus, Aspergillus niger, Klebsiella pneumoniae, Steptococcus pyogenes, Salmonella choleraesuis, Escherichia coli, Trichophyton mentagrophytes*, and *Pseudomonas aeruginosa*. The antimicrobial compounds may also effective on viruses such H1-N1, Rhinovirus, Respiratory Syncytial, Poliovirus Type 1, Rotavirus, Influenza A, Herpes simplex types 1 & 2, Hepatitis A. and Human Coronavirus.

Antimicrobial compounds suitable in the composition can be any organic material which will not cause damage to fabric appearance (e.g., discoloration, coloration such as yellowing, bleaching). Water-soluble antimicrobial compounds include organic sulfur compounds, halogenated compounds, cyclic organic nitrogen compounds, low molecular weight aldehydes, quaternary compounds, dehydroacetic acid, phenyl and phenoxy compounds, or mixtures thereof.

The composition may include a quaternary compound. Examples of commercially available quaternary compounds suitable for use in the composition is BARQUAT® available from Lonza Corporation; and didecyl dimethyl ammonium chloride quat under the trade name BARDAC® 2250 from Lonza Corporation.

The antimicrobial compound, if present, may be present in an amount from about 500 ppm to about 7000 ppm, alternatively from about 1000 ppm to about 5000 ppm, alternatively from about 1000 ppm to about 3000 ppm, alternatively from about 1400 ppm to about 2500 ppm, by weight of the composition.

The composition may include a preservative. The preservative may be included in an amount sufficient to prevent spoilage or prevent growth of inadvertently added microorganisms for a specific period of time, but not sufficient enough to contribute to the odor neutralizing performance of the composition. In other words, the preservative is not being used as the antimicrobial compound to kill microorganisms on the surface onto which the composition is deposited in order to eliminate odors produced by microorganisms. Instead, it is being used to prevent spoilage of the composition in order to increase the shelf-life of the composition.

The preservative can be any organic preservative material which will not cause damage to fabric appearance, e.g., discoloration, coloration, bleaching. Suitable water-soluble preservatives include organic sulfur compounds, halogenated compounds, cyclic organic nitrogen compounds, low molecular weight aldehydes, parabens, propane diaol materials, isothiazolinones, quaternary compounds, benzoates, low molecular weight alcohols, dehydroacetic acid, phenyl and phenoxy compounds, or mixtures thereof.

Non-limiting examples of water-soluble preservatives include a mixture of about 77% 5-chloro-2-methyl-4-isothiazolin-3-one and about 23% 2-methyl-4-isothiazolin-3-one, a broad spectrum preservative available as a 1.5% freshening solution under the trade name Kathon® CG by Rohm and Haas Co.; 5-bromo-5-nitro-1,3-dioxane, available under the tradename Bronidox L® from Henkel; 2-bromo-2-nitropropane-1,3-diol, available under the trade name Bronopol® from Inolex; 1,1'-hexamethylene bis(5-(p-chlorophenyl) biguanide), commonly known as chlorhexidine, and its salts, e.g., with acetic and digluconic acids; a 95:5 mixture of 1,3-bis(hydroxymethyl)-5,5-dimethyl-2,4-imidazolidinedione and 3-butyl-2-iodopropynyl carbamate, available under the trade name Glydant Plus® from Lonza; N-[1,3-bis(hydroxymethyl)2,5-dioxo-4-imidazolidinyl]-N,N'-bis (hydroxy-methyl) urca, commonly known as diazolidinyl urea, available under the trade name Germall® II from Sutton Laboratories, Inc.; N,N"-methylenebis{N'-[1-(hydroxymethyl)-2,5-dioxo-4-imidazolidinyl]urca}, commonly known as imidazolidinyl urea, available, e.g., under the trade name Abiol® from 3V-Sigma; Unicide U-13® from Induchem; Germall 115® from Sutton Laboratories, Inc.; polymethoxy bicyclic oxazolidine, available under the trade name Nuosept® C from Hüls America; formaldehyde; glutaraldehyde; polyaminopropyl biguanide, available under the trade name Cosmocil CQ® from ICI Americas, Inc., or under the trade name Mikrokill® from Brooks, Inc; dehydroacetic acid; and benzsiothiazolinone available under the trade name Koralone™ B-119 from Rohm and Hass Corporation.

The preservative, if present, may be present at a level of from about 0.0001% to about 0.5%, alternatively from about 0.0002% to about 0.2%, alternatively from about 0.0003% to about 0.1%, by weight of the composition.

The composition may include a wetting agent that provides a low surface tension that permits the composition to spread readily and more uniformly on hydrophobic surfaces like polyester and nylon. The spreading of the composition also allows it to dry faster, so that the treated material is ready to use sooner. Furthermore, a composition containing a wetting agent may penetrate hydrophobic, oily soil better for improved malodor neutralization. A composition containing a wetting agent may also provide improved "in-wear" electrostatic control. For concentrated compositions, the wetting agent facilitates the dispersion of many actives such as antimicrobial actives and perfumes in the concentrated compositions.

Non-limiting examples of wetting agents include block copolymers of ethylene oxide and propylene oxide. Suitable block polyoxyethylene-polyoxypropylene polymeric surfactants include those based on ethylene glycol, propylene glycol, glycerol, trimethylolpropane and ethylenediamine as the initial reactive hydrogen compound. Polymeric compounds made from a sequential ethoxylation and propoxylation of initial compounds with a single reactive hydrogen atom, such as $C_{12-18}$ aliphatic alcohols, are not generally compatible with the cyclodextrin. Certain of the block polymer surfactant compounds designated Pluronic® and Tetronic® by the BASF-Wyandotte Corp., Wyandotte, Michigan, are readily available.

Non-limiting examples of cyclodextrin-compatible wetting agents of this type are described in U.S. Pat. No. 5,714,137 and include the Silwet® surfactants available from Momentive Performance Chemical, Albany, New York. Exemplary Silwet® surfactants are as follows:

| Name | Average MW |
|---|---|
| L-7608 | 600 |
| L-7607 | 1,000 |
| L-77 | 600 |
| L-7605 | 6,000 |
| L-7604 | 4,000 |
| L-7600 | 4,000 |
| L-7657 | 5,000 |
| L-7602 | 3,000; |

and mixtures thereof.

The total amount of surfactants (e.g. solubilizer, wetting agent) present in the composition may be from 0% to about 3% or no more than 3%, alternatively from 0% to about 1% or no more than 1%, alternatively from 0% to about 0.9% or no more than 0.9%, alternatively from 0% to about 0.7 or no more than 0.7%, alternatively from 0% to about 0.5% or no more than 0.5%, alternatively from 0% to 0.3% or no more than about 0.3%, by weight of the composition. Compositions with higher concentrations may make fabrics susceptible to soiling and/or leave unacceptable visible stains on fabrics as the solution evaporates.

The aqueous composition may include a carrier. The carrier may be water. The water may be distilled, deionized, tap, or further purified forms of water. Water may be present in any amount for the composition to be an aqueous solution. Water may be present in an amount from about 85% to 99.5%, alternatively from about 90% to about 99.5%, alternatively from about 92% to about 99.5%, alternatively from about 95%, by weight of said composition. Water containing a small amount of low molecular weight monohydric alcohols (e.g., ethanol, methanol, and isopropanol, or polyols, such as ethylene glycol and propylene glycol) can also be useful. However, the volatile low molecular weight monohydric alcohols such as ethanol and/or isopropanol should be limited since these volatile organic compounds will contribute both to flammability problems and environmental pollution problems. If small amounts of low molecular weight monohydric alcohols are present in the composition due to the addition of these alcohols to such things as perfumes and as stabilizers for some preservatives, the level of monohydric alcohol may be less than about 6%, alternatively less than about 3%, alternatively less than about 1%, by weight of the composition.

Adjuvants can be optionally added to the composition herein for their known purposes. Such adjuvants include, but are not limited to, water soluble metallic salts, antistatic agents, insect and moth repelling agents, colorants, antioxidants, and mixtures thereof.

METHODS

Dv90 Particle Size Test Method

One of the major spray habits for the aerosol users is the spritzing behavior where the consumers do multiple quick sprays that results in large droplets at the end of every spray. The experiment is conducted to reflect similar consumer spray habits. The Dv90 particle size data is measured and analyzed using Malvern Panalytical's Spraytec 2000. The spray dispenser is placed in a position where the spray generated is perpendicular to the laser of the Malvern Equipment. The discharge orifice of the nozzle is placed one inch away from the laser to capture the maximum possible particles passing through the laser before falling. The spray is achieved through one complete press of the actuator that fully opens the valve stem to create a fully developed spray and a quick release to capture the spray profile at the valve shut off. The spray duration of one complete press and a quick release of the actuator lasts 400 milliseconds, where in the first segment of about 350 milliseconds represent the valve stem in a fully open position and the last segment of about 50 milliseconds represents the actuator being released and the valve stem moving from the fully open position to the closed position before complete shut-off. The particle size distribution and Dv90 particle size is obtained for every 4 milliseconds (data acquisition rate is set at 250 Hz for Rapid measurement) using the Malvern, where the Dv90 represents the particle diameter that is larger than 90% of the sampled volume. An example complete data set for a 400 milliseconds spray from the Example 1 nozzle is shown below in Table 7.

The following values can be determined from the resulting data set:

| |
|---|
| Fully Open minimum Dv90 particle size |
| Fully Open maximum Dv90 particle size |
| Fully Open Dv90 particle size Range |
| Minimum Dv90 particle size |
| Closing Maximum Dv90 particle size |
| Ratio of Closing Maximum Dv90:Minimum Dv90 |

EXAMPLES

Nozzles described in Tables 1 and 2 were analyzed, including comparative examples and an example of the present claims, and the Dv90 particle sizes were reported in Tables 3-7.

Comparative Nozzle 1 has a constant chamber diameter (CD) (like a bore hole) throughout the chamber depth (CH), Comparative Nozzle 2 has a combination of bore and conically reducing CD throughout the CH, Comparative Nozzle 3 is the Great Value Linen Fresh Aerosol Room Air Freshener product commercially available from Walmart, and Example Nozzle 1 has a gradually reducing curvature formed by the reducing CD throughout the CH as described in this disclosure.

TABLE 1

Nozzle dimensions for comparative and example nozzles

| Nozzle | OD (μm) | CD (μm) | CD/OD | OH (μm) | OH/OD | n | CH (μm) | CH/CD | VH (μm) |
|---|---|---|---|---|---|---|---|---|---|
| Comparative 1 (In-Market Nozzle with a Compressed Gas Propellant System) | 330 | 762 | 2.309 | 254 | 0.770 | 3 | 533 | 0.699 | 330 |
| Comparative 2 (In-Market Nozzle with a Compressed Gas Propellant System) | 330 | 965 | 2.924 | 432 | 1.309 | 3 | 533 | 0.552 | 254 |

TABLE 1-continued

| Nozzle dimensions for comparative and example nozzles | | | | | | | | | |
|---|---|---|---|---|---|---|---|---|---|
| Nozzle | OD (μm) | CD (μm) | CD/OD | OH (μm) | OH/OD | n | CH (μm) | CH/CD | VH (μm) |
| Comparative 3 (In-Market Nozzle with a Compressed Gas Propellant System) | 340 | 815 | 2.397 | | | 3 | | | |
| Example 1 | 305 | 699 | 2.292 | 302 | 0.990 | 3 | 369 | 0.528 | 246 |

TABLE 2

| Supply Channel length for comparative and example nozzles | |
|---|---|
| Nozzle | Supply Channel Length ($L_{SC}$) (mm) |
| Comparative Nozzle 1 (In-Market Nozzle with a Compressed Gas Propellant System) | 48 |
| Comparative Nozzle 2 (In-Market Nozzle with a Compressed Gas Propellant System) | 48 |
| Comparative Nozzle 3 (In-Market Nozzle with a Compressed Gas Propellant System) | 65 |
| Example Nozzle 1 | 48 |

'Fully Open minimum Dv90 particle size' and 'Fully Open maximum Dv90 particle size' represents the minimum and maximum value of Dv90 respectively recorded in the first 350 ms when the valve is in fully open state. The difference between these minimum and maximum values represents the range of Dv90 particle size generated when the valve is in fully open state and defined as 'Fully Open Dv90 particle size Range'. The change of particle size during the single cycle of actuator press and release is determined by two parameters, 'Minimum Dv90 particle size' and 'Closing Maximum Dv90 particle size'. 'Minimum Dv90 particle size' represents the minimum value of Dv90 that is recorded within the cycle of 400 ms spray duration. 'Closing Maximum Dv90 particle size' represent the maximum value of Dv90 that is recorded within the cycle of 400 ms spray duration. "Closing Maximum Dv90 particle size' is typically reported in the last 50 ms when the valve transition from fully open to close position. The restriction of flow from the closing valve changes the pressure inside the swirl chamber and typically produces larger particles before completely shut off. 'Ratio of Closing Maximum Dv90: Minimum Dv90' is the ratio of above two parameters described and illustrates the consistency of the particle size during the actuator press and release cycle. A lower value signifies relatively consistent particle size during the spray cycle defined above.

The below particle sizes are all in microns (μ) unless otherwise stated.

TABLE 3

| Dv90 Particle Sizes for Comparative Nozzle 1 | | | | |
|---|---|---|---|---|
| Comparative Nozzle 1 | Sample1 | Sample2 | Sample3 | Average |
| Fully Open minimum Dv90 particle size | 106.61 | 99.49 | 111.73 | 105.94 |
| Fully Open maximum Dv90 particle size | 116.68 | 109.06 | 122.42 | 116.05 |
| Fully Open Dv90 particle size Range | 10.07 | 9.57 | 10.69 | 10.11 |
| Minimum Dv90 particle size | 106.61 | 99.49 | 111.73 | 105.94 |
| Closing Maximum Dv90 particle size | 683.13 | 371.20 | 687.36 | 580.56 |
| Ratio of Closing Maximum Dv90:Minimum Dv90 | 6.41 | 3.73 | 6.15 | 5.43 |

TABLE 4

| Dv90 Particle Sizes for Comparative Nozzle 2 | | | | |
|---|---|---|---|---|
| Comparative Nozzle 2 | Sample1 | Sample2 | Sample3 | Average |
| Fully Open minimum Dv90 particle size | 89.83 | 72.30 | 94.71 | 85.61 |
| Fully Open maximum Dv90 particle size | 98.93 | 81.14 | 109.48 | 96.52 |
| Fully Open Dv90 particle size Range | 9.10 | 8.84 | 14.77 | 10.90 |
| Minimum Dv90 particle size | 89.59 | 72.30 | 89.91 | 83.93 |
| Closing Maximum Dv90 particle size | 633.75 | 677.38 | 393.21 | 568.11 |
| Ratio of Closing Maximum Dv90:Minimum Dv90 | 7.07 | 9.37 | 4.37 | 6.94 |

TABLE 5

| Dv90 Particle Sizes for Comparative Nozzle 3 | | | | |
|---|---|---|---|---|
| Comparative Nozzle 3 | Sample1 | Sample2 | Sample3 | Average |
| Fully Open minimum Dv90 particle size | 103.02 | 103.98 | 118.06 | 108.35 |
| Fully Open maximum Dv90 particle size | 113.61 | 115.91 | 130.27 | 119.93 |
| Fully Open Dv90 particle size Range | 10.59 | 11.93 | 12.21 | 11.58 |
| Minimum Dv90 particle size | 103.02 | 103.98 | 118.06 | 108.35 |
| Closing Maximum Dv90 particle size | 712.50 | 787.37 | 784.75 | 761.54 |
| Ratio of Closing Maximum Dv90:Minimum Dv90 | 6.92 | 7.57 | 6.65 | 7.05 |

TABLE 6

| Dv90 Particle Sizes for Example Nozzle 1 | | | | |
|---|---|---|---|---|
| Example Nozzle 1 | Sample1 | Sample2 | Sample3 | Average |
| Fully Open minimum Dv90 particle size | 83.13 | 88.26 | 84.37 | 85.25 |
| Fully Open maximum Dv90 particle size | 90.50 | 94.08 | 93.72 | 92.77 |
| Fully Open Dv90 particle size Range | 7.37 | 5.82 | 9.35 | 7.51 |
| Minimum Dv90 particle size | 83.13 | 87.94 | 84.37 | 85.15 |
| Closing Maximum Dv90 particle size | 97.19 | 102.84 | 93.72 | 97.92 |
| Ratio of Closing Maximum Dv90:Minimum Dv90 | 1.17 | 1.17 | 1.11 | 1.15 |

TABLE 7

| Particle Size Data for Example Nozzle 1 for every 4 milliseconds | | | |
|---|---|---|---|
| Spray Duration (ms) | Sample1 | Sample2 | Sample3 |
| 0 | 86.02 | 89 | 88.56 |
| 4 | 87.37 | 89.99 | 91.77 |
| 8 | 85.67 | 88.73 | 88.48 |
| 12 | 84.54 | 90.32 | 88.65 |
| 16 | 86.68 | 91.46 | 89.15 |
| 20 | 85.73 | 89.54 | 87.74 |
| 24 | 85.91 | 90.87 | 88.99 |
| 28 | 84.65 | 93.24 | 89.74 |
| 32 | 85.27 | 89.04 | 89.27 |
| 36 | 84.34 | 92.47 | 86.75 |
| 40 | 84.74 | 90.32 | 89.14 |
| 44 | 85.28 | 89.94 | 87.71 |
| 48 | 86.27 | 92.16 | 89.88 |
| 52 | 84.98 | 89.2 | 88.88 |
| 56 | 86.4 | 90.24 | 88.03 |
| 60 | 90.5 | 91.53 | 88.24 |
| 64 | 86.07 | 89.87 | 88.89 |
| 68 | 85.58 | 89.12 | 87.41 |
| 72 | 85.27 | 90.12 | 89.34 |
| 76 | 85.24 | 90.28 | 87.46 |
| 80 | 87.27 | 90.54 | 88.14 |
| 84 | 86.35 | 91.1 | 88.33 |
| 88 | 85.91 | 90.01 | 86.98 |
| 92 | 84.79 | 90.17 | 90.59 |
| 96 | 84.71 | 89.84 | 87.41 |
| 100 | 83.13 | 91.65 | 89.3 |
| 104 | 86.62 | 91.32 | 93.72 |
| 108 | 86.02 | 92.04 | 88.65 |
| 112 | 85.21 | 90.13 | 87.34 |
| 116 | 85.63 | 91.53 | 87.88 |
| 120 | 86.95 | 90.32 | 89.4 |
| 124 | 85.43 | 90.88 | 87.32 |
| 128 | 85.09 | 88.86 | 87.46 |
| 132 | 86.26 | 90.66 | 89.31 |
| 136 | 84.3 | 91.21 | 91.32 |
| 140 | 84.41 | 90.79 | 89.13 |
| 144 | 84.43 | 91.45 | 89.88 |
| 148 | 84.58 | 88.7 | 88.28 |
| 152 | 85.29 | 90.66 | 87 |
| 156 | 85.38 | 92.69 | 88.38 |
| 160 | 87.68 | 92.22 | 88.4 |
| 164 | 85.26 | 89.54 | 87.81 |
| 168 | 86.1 | 89.16 | 92.63 |
| 172 | 85.7 | 92.04 | 89.02 |
| 176 | 86.85 | 91.31 | 88.61 |
| 180 | 84.46 | 94.08 | 86.36 |
| 184 | 86.47 | 90.6 | 87.52 |
| 188 | 85.4 | 88.64 | 86.06 |
| 192 | 85.07 | 90.82 | 85.73 |
| 196 | 85.52 | 91.44 | 86.52 |
| 200 | 86.93 | 92.09 | 85.71 |
| 204 | 85.93 | 91.23 | 87.02 |
| 208 | 84.7 | 90.94 | 88.24 |
| 212 | 84.41 | 92.91 | 86.91 |
| 216 | 86.3 | 90.94 | 84.7 |
| 220 | 86.04 | 90 | 84.46 |
| 224 | 86.16 | 93.93 | 87.4 |
| 228 | 86.24 | 90.06 | 87.84 |
| 232 | 86.11 | 88.26 | 87.16 |
| 236 | 85.95 | 91.21 | 87.77 |
| 240 | 84.96 | 89.24 | 85.8 |
| 244 | 83.65 | 91.07 | 86.83 |
| 248 | 83.88 | 89.51 | 84.92 |
| 252 | 84.94 | 92.14 | 85.29 |
| 256 | 84.48 | 91.7 | 86.22 |
| 260 | 86.31 | 91.71 | 87.91 |
| 264 | 85.02 | 90.17 | 89.83 |
| 268 | 85.68 | 92.88 | 88.52 |
| 272 | 84.74 | 90.41 | 84.81 |
| 276 | 83.89 | 90.33 | 85.31 |
| 280 | 84.76 | 90.98 | 86.08 |
| 284 | 85.24 | 90.86 | 85.86 |
| 288 | 85.83 | 91.06 | 85.71 |
| 292 | 86.31 | 89.73 | 87.6 |
| 296 | 85.37 | 91.01 | 85.19 |
| 300 | 85.71 | 90.77 | 84.37 |
| 304 | 85.67 | 90.54 | 88.12 |
| 308 | 86.07 | 91.61 | 85.25 |
| 312 | 84.09 | 91.82 | 84.82 |
| 316 | 87.22 | 90.32 | 87.28 |
| 320 | 86.53 | 90.62 | 87.23 |
| 324 | 86.58 | 91.37 | 86.88 |
| 328 | 84.03 | 90.31 | 84.92 |
| 332 | 84.84 | 90.73 | 91.57 |
| 336 | 86.71 | 89.26 | 85.78 |
| 340 | 84.78 | 91.22 | 86.65 |
| 344 | 84.45 | 91.44 | 86.86 |
| 348 | 84.72 | 92.21 | 88.27 |
| 352 | 85.63 | 91.49 | 87.34 |
| 356 | 84.37 | 88.88 | 85.33 |
| 360 | 83.43 | 89.7 | 84.8 |
| 364 | 86.28 | 89.77 | 86.6 |
| 368 | 85.68 | 88.98 | 85.34 |
| 372 | 85.17 | 88.55 | 88.32 |
| 376 | 84.6 | 89.15 | 86.44 |
| 380 | 85.67 | 87.94 | 86.97 |
| 384 | 87.17 | 90.86 | 86.4 |
| 388 | 85.14 | 91.59 | 86.74 |
| 392 | 85.68 | 92.57 | 87.18 |
| 396 | 85.85 | 91.07 | 86.24 |
| 400 | 97.19 | 102.84 | 90.87 |
| Fully Open minimum Dv90 particle size | 83.13 | 88.26 | 84.37 |
| Fully Open maximum Dv90 particle size | 90.50 | 94.08 | 93.72 |
| Fully Open Dv90 particle size Range | 7.37 | 5.82 | 9.35 |
| Minimum Dv90 particle size | 83.13 | 87.94 | 84.37 |
| Closing Maximum Dv90 particle size | 97.19 | 102.84 | 93.72 |
| Ratio of Closing Maximum Dv90:Minimum Dv90 | 1.17 | 1.17 | 1.11 |

Without intending to be bound by theory, it is contemplated that the Example Nozzle 1 outperformed the comparative nozzles due to the swirl chamber having a decreasing CD, thereby preventing dead zones within the swirl chamber of Example Nozzle 1, which in turn resulted in reduced Dv90 particle sizes as compared to the Comparative Nozzles.

As shown in Tables 3-5, the comparative nozzles 1, 2 & 3 has large variation on the particle size within the cycle of actuator press and release illustrated by average 'Ratio of Closing Maximum Dv90: Minimum Dv90' of 5.43, 6.94 and 7.05 respectively. However, as shown in Table 6, an optimal combination of swirl chamber parameters in Example Nozzle 1, such as reduced CD, reduced CH and hence reduced swirl chamber volume leads to relatively consistent particle size during the cycle of actuator press and release. This is defined as 'Ratio of Closing Maximum Dv90: Minimum Dv90' of 1.15.

When the actuator is released, the valve starts to close, however due to the large CD and large CH, large volume of fluid inside the swirl chamber continues to atomize and disperse the large particles through the orifice before being completely shut off. Each of Comparative Nozzles 1, 2 and 3 has at least one of the listed swirl chamber dimensions: CD, CH, and swirl chamber volume larger versus Example Nozzle 1. For example, even though Comparative Nozzle 2 has a reducing CD, because of the above phenomenon, it still generates large particles when the valve transition from fully open to close position. The average 'Closing Maximum Dv90 particle size' for Comparative Nozzle 2 is 568.11 microns (Table 4). It can also be noted that the parameter 'Fully Open minimum Dv90 particle size' is almost similar between Comparative Nozzle 2 and Example Nozzle 1, a particle size of about 85 microns. This is because of the combination of Nozzle parameters including Orifice and swirl chamber features can produce smaller particle size when the valve is at fully open state and atomization is efficient. However, when the actuator is released, the ability of the nozzle to quickly shut off without producing large particles is possible only when using an optimal swirl chamber features such as reduced CD, reduced CH, and less swirl chamber volume as described in Example Nozzle 1. The average 'Closing Maximum Dv90 particle size' for Example Nozzle 1 is 97.92 microns (Table 6) which is much smaller compared to average 'Closing Maximum Dv90 particle size' of comparative Nozzles 1, 2 and 3 of 580.56 microns, 568.11 microns, and 761.54 microns, respectively. Therefore, Example Nozzle 1 exhibits a markedly lesser average 'Ratio of Closing Maximum Dv90: Minimum Dv90' of 1.15 as compared to Comparative Nozzle 1 (at a Ratio of 5.43), Comparative Nozzle 2 (at a Ratio of 6.94), and Comparative Nozzle 3 (at a Ratio of 7.05).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

It should be understood that every maximum numerical limitation given throughout this specification will include every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any embodiments disclosed or claimed herein or that it alone, or in any combination with any other reference or references, teaches, suggests or discloses any such embodiment. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. A spray dispenser comprising:

a container comprising a first end portion, a second end portion, and a sidewall extending between the first end portion and the second end portion, the container defining an interior for containing a composition and a compressed gas propellant, wherein the first end portion comprises a neck defining an opening;

a valve body disposed at least partially within the opening of the container, the valve body comprising an inner passageway in fluid communication with the container;

a valve stem extending through the inner passageway, the valve stem having a valve stem channel, the valve stem being movable from a closed position to a fully open position, wherein in the closed position the valve stem channel is not in fluid communication with the interior of the container, and wherein in the fully open position the valve stem channel is in fluid communication with the interior of the container;

a supply channel in fluid communication with the valve stem, wherein the supply channel defines a supply channel length $L_{SC}$ measured along a central axis fluid flow through the supply channel, wherein the supply channel length $L_{SC}$ is greater than 23 mm;

an actuator in operative communication with the valve stem, wherein the actuator is movable from resting position to a fully actuated position, wherein in the resting position the valve stem is in the closed position, and wherein in the fully actuated position the valve stem is in the fully open position; and a nozzle in fluid communication with the supply channel, wherein the nozzle comprises a swirl chamber in fluid communication with a discharge orifice, wherein a minimum Dv90 particle size exiting the discharge orifice when the valve stem is either in the fully open position or when the valve stem is displacing from the fully open position to the closed position defines a minimum Dv90 particle size, and wherein a maximum Dv90 particle size exiting the discharge orifice when the valve stem displaces from the fully open position to the closed position defines a closing maximum Dv90 particle size, wherein a ratio of the closing maximum Dv90 particle size to the minimum Dv90 particle size is less than 3.5, measured according to the Dv90 Particle Size Test Method described herein.

2. The spray dispenser of claim 1, wherein the container comprises a composition and a compressed gas propellant.

3. The spray dispenser of claim 2, wherein the composition is an air or fabric freshening composition.

4. The spray dispenser of claim 1, wherein a flow rate of the composition discharged from the nozzle is in the range of 1.3 g/s to 1.9 g/s.

5. The spray dispenser of claim 1, wherein the minimum Dv90 particle size is in the range of 60 microns to 90 microns.

6. The spray dispenser of claim 1, wherein an initial pressure in the container is less than 1100 kPa at 21° C.

7. The spray dispenser of claim 1, wherein the swirl chamber has a chamber diameter CD of 800 mm or less and a chamber depth CH of less than 500 microns.

8. The spray dispenser of claim 1, wherein the actuator is a push-button or trigger.

9. The spray dispenser of claim 1, wherein the container, the valve body, the valve stem, the nozzle, and the actuator comprise plastic.

10. A spray dispenser, the dispenser comprising:

a container comprising a first end portion, a second end portion, and a sidewall extending between the first end portion and the second end portion, the container defining an interior for containing a composition and a compressed gas propellant, wherein the first end portion comprises a neck defining an opening;

a valve body disposed at least partially within the opening of the container, the valve body comprising an inner passageway in fluid communication with the container, a valve stem extending through the inner passageway, wherein the valve stem having a valve stem channel, the valve stem is movable from a closed position to a fully open position, wherein in the closed position the valve stem channel is not in fluid communication with the interior of the container, wherein in the fully open position the valve stem channel is in fluid communication with the interior of the container;

a supply channel in fluid communication with the valve stem, wherein the supply channel defines a supply channel length $L_{SC}$ measured along a central axis fluid flow through the supply channel, wherein the supply channel length $L_{SC}$ is greater than 23 mm;

an actuator in operative communication with the valve stem, wherein the actuator is movable from resting position to a fully actuated position, wherein in the resting position the valve stem is in the closed position, and wherein in the fully actuated position the valve stem is in the fully open position;

a nozzle in fluid communication with the fluid channel, wherein the nozzle comprises a swirl chamber in fluid communication with a discharge orifice, wherein a minimum Dv90 particle size exiting the discharge orifice when the valve stem is fully open defines a fully open minimum Dv90 particle size, and wherein a maximum Dv90 particle size exiting the discharge orifice when the valve stem is fully open defines a fully open maximum Dv90 particle size, wherein a fully open Dv90 particle size range is a difference between the fully open maximum Dv90 particle size and the fully open minimum Dv90 particle size, wherein the fully open Dv90 particle size range is less than 10 microns, according to the Dv90 Particle Size Test Method described herein.

11. The spray dispenser of claim 10, wherein the container comprises a composition and a compressed gas propellant.

12. The spray dispenser of claim 11, wherein the composition is an air or fabric freshening composition.

13. The spray dispenser of claim 10, wherein a minimum Dv90 particle size exiting the discharge orifice when the valve stem is either in the fully open position or when the valve stem is displacing from the fully open position to the closed position defines an overall minimum Dv90 particle size, and wherein a maximum Dv90 particle size exiting the discharge orifice when the valve stem displaces from the fully open position to the closed position defines a closing maximum Dv90 particle size, wherein a ratio of the closing maximum Dv90 particle size to the overall minimum Dv90 particle size is less than 3.5, measured according to the Dv90 Particle Size Test Method described herein.

14. The spray dispenser of claim 10, wherein a flow rate of the composition discharged from the nozzle is in the range of 1.3 g/s to 1.9 g/s.

15. The spray dispenser of claim 10, wherein the minimum Dv90 particle size is in the range of 60 microns to 90 microns.

16. The spray dispenser of claim 10, wherein an initial pressure in the container is less than 1100 kPa at 21° C.

17. The spray dispenser of claim 10, wherein the container contains the composition, and the composition comprises a perfume mixture.

18. The spray dispenser of claim 10, wherein the actuator is a push-button or trigger.

19. The spray dispenser of claim 10, wherein the container, the valve body, the valve stem, the nozzle, and the actuator comprise plastic.

20. The spray dispenser of claim 10, wherein the swirl chamber has a chamber diameter of 800 mm or less.

* * * * *